(12) United States Patent
Burke et al.

(10) Patent No.: US 11,585,309 B2
(45) Date of Patent: Feb. 21, 2023

(54) SUPPLEMENTAL STARTING SYSTEM

(71) Applicant: KOLD-BAN INTERNATIONAL, LTD., Lake in the Hills, IL (US)

(72) Inventors: James O. Burke, Richmond, IL (US); Dean R. Solberg, Burlington, WI (US)

(73) Assignee: KOLD-BAN INTERNATIONAL LTD., Lake In The Hills, IL (US)

( * ) Notice: Subject to any disclaimer, the term of this patent is extended or adjusted under 35 U.S.C. 154(b) by 0 days.

(21) Appl. No.: 17/860,304

(22) Filed: Jul. 8, 2022

(65) Prior Publication Data

US 2022/0341384 A1 Oct. 27, 2022

Related U.S. Application Data

(62) Division of application No. 17/430,603, filed as application No. PCT/US2020/017644 on Feb. 11, 2020, now Pat. No. 11,421,641.

(Continued)

(51) Int. Cl.
*F02N 11/08* (2006.01)
*F02N 11/10* (2006.01)
*H02J 7/34* (2006.01)

(52) U.S. Cl.
CPC ........ *F02N 11/0866* (2013.01); *F02N 11/087* (2013.01); *F02N 11/10* (2013.01);
(Continued)

(58) Field of Classification Search
CPC .................................................. F02N 11/0885
See application file for complete search history.

(56) References Cited

U.S. PATENT DOCUMENTS 4,028,593 A * 6/1977 Newell .................... H02H 7/08
318/471
4,042,966 A * 8/1977 Newell .................... H02H 7/08
318/473
(Continued)

FOREIGN PATENT DOCUMENTS

CA     2538646 A1 * 9/2006 .......... F02N 11/0866
CN   101652263 A  * 2/2010 .......... F02N 11/0866
(Continued)

OTHER PUBLICATIONS

International Search Report and Written Opinion regarding PCT/US2020/017644 dated Apr. 27, 2020, 14 pages.

*Primary Examiner* — Kevin R Steckbauer
(74) *Attorney, Agent, or Firm* — Crowell & Moring LLP

(57) ABSTRACT

The disclosure is directed to a system and method for providing supplemental power to start one or more cranking motors. The supplemental starting system includes a starting-signal isolator configured to connect to one or more electrical starting-signal wires providing starting signal to one or more cranking motors, a resetting relay electrically connecting to the starting-signal isolator, a programmable logic controller (PLC) electrically connecting to the resetting relay, a supplemental battery relay electrically connecting to the starting-signal isolator and the PLC, a supplemental battery electrically connecting to the supplemental battery relay, and a positive output-terminal electrically connecting to the supplemental battery relay. When an output of the starting-signal isolator is higher than a threshold voltage, the resetting relay and the supplemental battery relay are configured to be in a close state, so that the supplemental starting system is configured to provide electricity to one of the one or more cranking motors.

8 Claims, 17 Drawing Sheets

Related U.S. Application Data

(60) Provisional application No. 62/880,232, filed on Jul. 30, 2019, provisional application No. 62/806,177, filed on Feb. 15, 2019.

(52) U.S. Cl.
CPC ....... H02J 7/345 (2013.01); *F02N 2011/0885* (2013.01); *F02N 2200/061* (2013.01); *F02N 2200/063* (2013.01)

(56) References Cited

U.S. PATENT DOCUMENTS

| | | | | |
|---|---|---|---|---|
| 6,232,674 B1 * | 5/2001 | Frey | .................. | H02M 3/1582 |
| | | | | 307/64 |
| 6,426,606 B1 * | 7/2002 | Purkey | ................ | H01M 6/5033 |
| | | | | 320/103 |
| 6,765,312 B1 * | 7/2004 | Urlass | .................. | H02J 7/1423 |
| | | | | 307/23 |
| 6,888,266 B2 * | 5/2005 | Burke | ................. | F02N 11/0866 |
| | | | | 307/10.6 |
| 7,134,415 B2 * | 11/2006 | Burke | ................. | F02N 11/0866 |
| | | | | 290/38 R |
| 7,362,005 B2 * | 4/2008 | Leblanc | .............. | F02N 11/0866 |
| | | | | 320/132 |
| 8,395,278 B2 * | 3/2013 | Cawthorne | ......... | F02N 11/0866 |
| | | | | 307/10.3 |
| 8,519,563 B2 * | 8/2013 | Lindstrom | .......... | F02N 11/0866 |
| | | | | 307/10.6 |
| 8,820,287 B2 * | 9/2014 | Solberg | ............... | F02N 11/0866 |
| | | | | 123/179.3 |
| 9,027,525 B2 * | 5/2015 | Almhagen | .............. | F02N 11/00 |
| | | | | 123/179.3 |
| 9,309,854 B2 * | 4/2016 | Provost | ..................... | F02N 3/02 |
| 10,026,238 B2 * | 7/2018 | Siekkinen | ............. | B60W 10/00 |
| 10,060,985 B2 * | 8/2018 | Siekkinen | ........... | F02N 11/0825 |
| 10,077,752 B1 * | 9/2018 | Lee | ......................... | H02J 7/345 |
| 10,202,958 B2 * | 2/2019 | Siekkinen | ............. | F02N 11/0818 |
| 10,703,310 B2 * | 7/2020 | Lounnas | ................ | B60R 16/03 |
| 10,723,296 B2 * | 7/2020 | Huang | .................. | F02N 11/0866 |
| 11,421,641 B2 * | 8/2022 | Burke | ..................... | H02J 7/345 |
| 2002/0041174 A1 * | 4/2002 | Purkey | ................ | H01M 50/296 |
| | | | | 320/103 |
| 2002/0130555 A1 * | 9/2002 | Burke | ................. | F02N 11/0866 |
| | | | | 307/10.6 |
| 2005/0224035 A1 * | 10/2005 | Burke | ................. | F02N 11/0866 |
| | | | | 290/38 R |
| 2006/0201724 A1 * | 9/2006 | Leblanc | ................ | H02J 7/0013 |
| | | | | 180/65.1 |
| 2006/0220610 A1 * | 10/2006 | Solberg | .................. | B60L 8/003 |
| | | | | 320/105 |
| 2011/0001354 A1 * | 1/2011 | Lindstrom | .......... | F02N 11/0866 |
| | | | | 307/9.1 |
| 2012/0032506 A1 * | 2/2012 | Cawthorne | ......... | F02N 11/0866 |
| | | | | 307/10.6 |
| 2013/0239921 A1 * | 9/2013 | Almhagen | .......... | F02N 11/0866 |
| | | | | 123/179.3 |
| 2013/0340698 A1 * | 12/2013 | Provost | ............... | F02N 11/0862 |
| | | | | 123/179.5 |
| 2016/0053737 A1 * | 2/2016 | Solberg | ............... | F02N 11/0866 |
| | | | | 701/113 |
| 2017/0016419 A1 * | 1/2017 | Siekkinen | ............ | G01R 31/382 |
| 2017/0016420 A1 * | 1/2017 | Siekkinen | ............ | F02N 11/0818 |
| 2017/0018126 A1 * | 1/2017 | Siekkinen | ............. | B60W 10/00 |
| 2018/0345888 A1 * | 12/2018 | Lounnas | ............... | F02N 11/0866 |
| 2020/0148143 A1 * | 5/2020 | Huang | ................ | H02J 7/00306 |
| 2021/0061107 A1 * | 3/2021 | Jehle | ......................... | B60L 3/04 |
| 2022/0145842 A1 * | 5/2022 | Burke | ................. | F02N 11/0866 |

FOREIGN PATENT DOCUMENTS

| | | | | |
|---|---|---|---|---|
| CN | 102996314 A | * | 3/2013 | ............. F02N 11/00 |
| CN | 104097516 A | * | 10/2014 | .......... F02N 11/0814 |
| CN | 104276044 A | * | 1/2015 | ............. B60L 58/20 |
| CN | 104097516 B | * | 8/2016 | .......... F02N 11/0814 |
| CN | 106351750 A | * | 1/2017 | ............. F02D 29/02 |
| CN | 106351751 A | * | 1/2017 | ............. B60L 58/10 |
| CN | 106351776 A | * | 1/2017 | ............. B60W 10/06 |
| CN | 104276044 B | * | 11/2017 | ............. B60L 58/20 |
| CN | 108349449 A | * | 7/2018 | ............. B60R 16/03 |
| CN | 106351776 B | * | 4/2019 | ............. B60W 10/06 |
| CN | 109723593 A | * | 5/2019 | ......... B60R 16/0307 |
| CN | 106351751 B | * | 9/2019 | ............. B60L 58/10 |
| CN | 106351750 B | * | 11/2019 | ............. F02D 29/02 |
| CN | 111757829 A | * | 10/2020 | ............. B60L 3/0084 |
| CN | 109723593 B | * | 9/2021 | ......... B60R 16/0307 |
| CN | 108349449 B | * | 1/2022 | ............. B60R 16/03 |
| DE | 10047970 A1 | * | 4/2001 | ............. B60K 6/485 |
| DE | 102006016893 A1 | * | 10/2007 | .......... F02N 11/0866 |
| DE | 102015112076 A1 | * | 2/2016 | ............. B60K 6/387 |
| DE | 102016112856 A1 | * | 1/2017 | ............. F02D 29/02 |
| DE | 102016112915 A1 | * | 1/2017 | ............. B60L 58/10 |
| DE | 102018200087 B3 | * | 6/2019 | ............. B60L 3/0084 |
| DE | 102016112915 B4 | * | 5/2021 | ............. B60L 58/10 |
| EP | 2568158 A1 | * | 3/2013 | ............. F02N 11/00 |
| EP | 2795650 B1 | * | 11/2015 | ............. F02N 11/08 |
| EP | 3477095 A1 | * | 5/2019 | ......... B60R 16/0307 |
| FR | 2991731 A1 | * | 12/2013 | ............. B60K 6/28 |
| FR | 3015571 A1 | * | 6/2015 | ............. F01D 19/00 |
| FR | 3043961 A1 | * | 5/2017 | ............. B60R 16/03 |
| JP | 2006029142 A | * | 2/2006 | .......... F02N 11/0866 |
| RU | 2731985 C1 | * | 9/2020 | ............. F02D 41/062 |
| WO | WO-2006000496 A1 | * | 1/2006 | ............. F02N 11/08 |
| WO | WO-2007118756 A1 | * | 10/2007 | .......... F02N 11/0866 |
| WO | WO-2009099383 A1 | * | 8/2009 | ............. B60R 16/033 |
| WO | WO-2013182817 A1 | * | 12/2013 | ............. B60K 6/28 |
| WO | WO-2013191712 A1 | * | 12/2013 | ............. F02N 11/0862 |
| WO | WO-2015097361 A1 | * | 7/2015 | ............. F01D 19/00 |
| WO | WO-2017088969 A1 | * | 6/2017 | ............. B60R 16/03 |
| WO | WO-2019134903 A1 | * | 7/2019 | ............. B60L 3/0084 |
| WO | WO-2020097282 A1 | * | 5/2020 | ............. B60R 16/033 |
| WO | WO-2020167755 A1 | | 8/2020 | |
| WO | WO-2020167755 A1 | * | 8/2020 | .......... F02N 11/0866 |

* cited by examiner

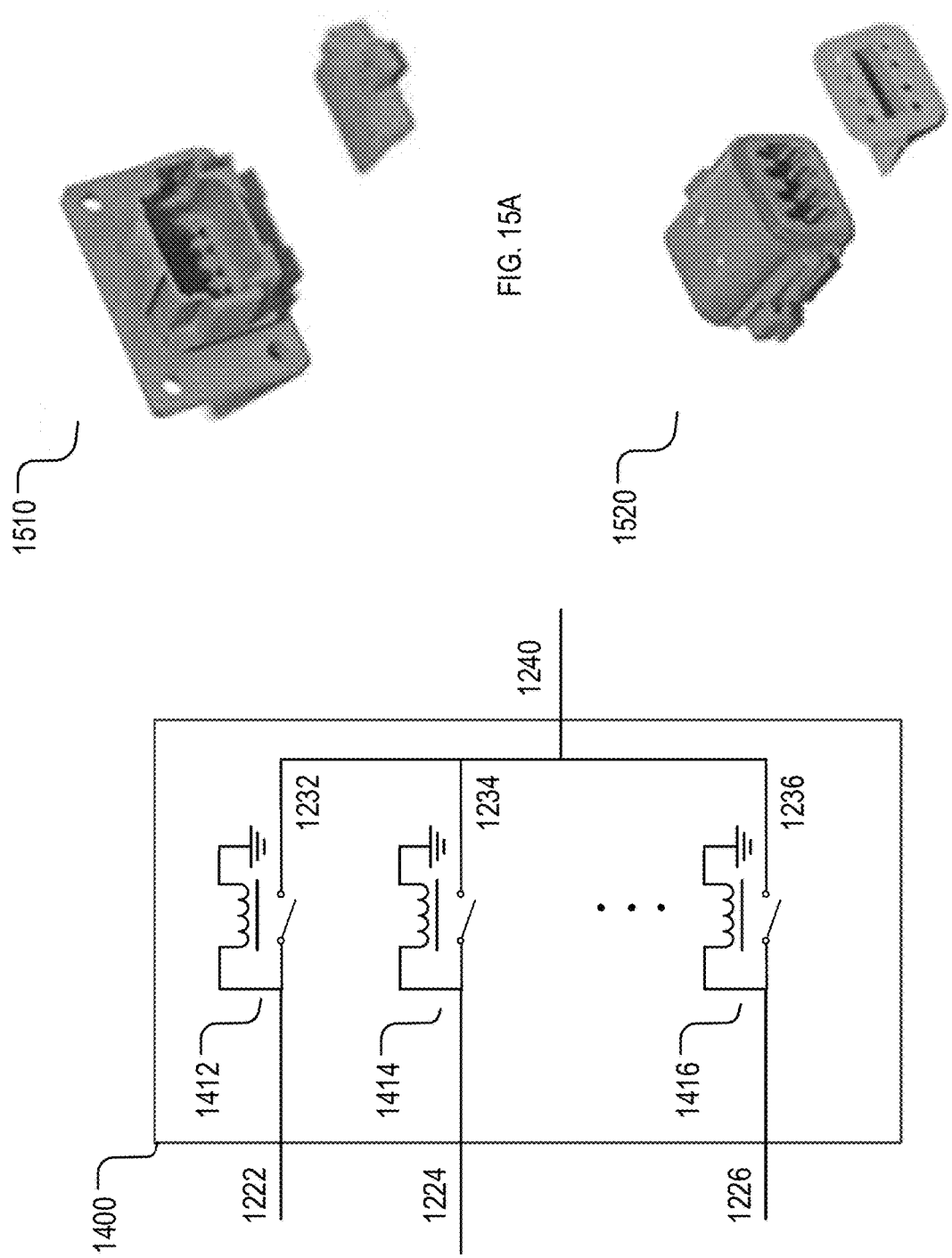

1700

```
┌─────────────────────────────────────────────────────────────┐
│ receiving, by a starting-signal isolator of a supplemental starting │
│ system, wherein the starting-signal isolator is configured to connect to │
│ one or more electrical starting signal wires which provides starting │
│ signal to one or more cranking motors          1710         │
└─────────────────────────────────────────────────────────────┘
``` receiving, by a starting-signal isolator of a supplemental starting system, wherein the starting-signal isolator is configured to connect to one or more electrical starting signal wires which provides starting signal to one or more cranking motors  1710 when one of the one or more electrical starting signal wires has the high voltage signal, outputting, by the starting-signal isolator of the supplemental starting system, a high voltage signal  1720 setting a resetting relay in an open state, wherein the resetting relay electrically connects to the starting-signal isolator  1730 resetting a first programmable logic controller (PLC) electrically connects to the resetting relay  1740 setting a supplemental battery relay in a close state, wherein the supplemental battery relay electrically connects to the starting-signal isolator and the PLC  1750 electrically connecting a positive terminal of a supplemental battery to a positive output-terminal of the supplemental starting system  1760 providing electricity to start one of the one or more cranking motors  1770

FIG. 17 electrically connecting, by an emergency starting switch of the supplemental starting system, a positive terminal of the supplemental battery to the supplemental battery relay, so that the supplemental battery relay is configured to be in the close state, and the supplemental starting system is configured to providing electricity to one of the one or more cranking motors

SUPPLEMENTAL STARTING SYSTEM

RELATED APPLICATIONS

This application is a divisional application of U.S. patent application Ser. No. 17/430,603, filed with the United States Patent and Trademark Office on Aug. 12, 2021, which is incorporated by reference in its entirety. U.S. patent application Ser. No. 17/430,603 is a national stage application of International Patent Application No. PCT/US2020/017644, filed under 35 U.S.C. § 371 with the United States Patent and Trademark Office on Feb. 11, 2020, which is incorporated by reference in its entirety. International Patent Application No. PCT/US2020/017644 claims priority to U.S. Provisional Application No. 62/806,177, filed with the United States Patent and Trademark Office on Feb. 15, 2019, and U.S. Provisional Application No. 62/880,232, filed with the United States Patent and Trademark Office on Jul. 30, 2019, both of which are incorporated by reference in their entireties.

BACKGROUND

1. Technical Field

This disclosure relates to vehicles or vessels of the type that include one or more internal combustion engines, one or more cranking motors, and a primary battery normally used to power the cranking motor. In particularly, this disclosure relates to improvements to such system that increase the reliability of engine starting.

2. Background Information

A starter that fails to crank an engine or cranks the engine too slowly may be caused by a low charged battery and/or under extreme environmental conditions, for example but not limited to, low temperatures. The proliferation of accessories or failing components in a vehicle or a vessel can place a significant load on a battery to the point that the battery will not start an engine when it is needed.

During starting, some starting systems of the vehicles or vessels fail to be monitored. Some starting systems fail to communicate with the vehicles or vessels. Some starting systems fail to perform diagnostics or reset the starting system when something is wrong.

Some vehicles or vessels may have one or more engines. Some starting systems fail to start the one or more engines in an organized manner. When an error occurs during starting one engine, some starting systems fail to reset itself.

Some vehicles or vessels may incorporate digital switching to start their cranking motor/engines, which may be an obstacle for some existing supplemental starting systems.

The present disclosure describes a supplemental starting system, improving the starting of one or more engines of a vehicle or vessel and addressing at least some of the drawbacks listed above.

BRIEF SUMMARY

The present disclosure describes a supplemental starting system for providing supplemental power to start one or more engines. The supplemental starting system includes a first supplemental starting switch, and a first resetting relay electrically connecting to the first supplemental starting switch. The supplemental starting system includes a first programmable logic controller (PLC) electrically connecting to the first resetting relay, and a first supplemental battery relay electrically connecting to the first supplemental starting switch and the first PLC. The supplemental starting system also includes a supplemental battery comprising a positive terminal electrically connecting to the first supplemental battery relay, a first positive output-terminal electrically connecting to the first supplemental battery relay, and a first negative output-terminal electrically connecting to a negative terminal of the supplemental battery. When the first supplemental starting switch is in a close state, the first resetting relay is configured to be in a close state, the first PLC is configured to reset, and the first supplemental battery relay is configured to be in a close state. When the first supplemental starting switch is in an open state, the first resetting relay is configured to be in an open state and the first PLC is configured to be in a working mode.

The present disclosure is also directed to a method for providing a supplementary starting system to start at least one cranking motor. The method includes setting a first supplemental switch of a supplemental starting system in a close state, and setting a first resetting relay in an open state, wherein the first resetting relay electrically connects to the first supplemental starting switch. The method includes resetting a PLC electrically connects to the first resetting relay, and setting a first supplemental battery relay in a close state, wherein the first supplemental battery relay electrically connects to the first supplemental starting switch and the first PLC. The method further includes connecting a positive terminal of a supplemental battery to a first positive output-terminal of the supplemental starting system, wherein a negative terminal of the supplemental battery is configured to connect to a first negative output-terminal of the supplemental starting system. The method further includes providing electricity to start a first cranking motor of a first engine, wherein a positive terminal of the first cranking motor is configured to connect to the first positive output-terminal of the supplemental starting system, and a negative terminal of the first cranking motor is configured to connect to the first negative output-terminal of the supplemental starting system.

The present disclosure describes a supplemental starting system for providing supplemental power to start one or more cranking motors. The supplemental starting system includes a starting-signal isolator configured to connect to one or more electrical starting-signal wires providing starting signal to one or more cranking motors. The supplemental starting system includes a resetting relay electrically connecting to the starting-signal isolator and a programmable logic controller (PLC) electrically connecting to the resetting relay. The supplemental starting system includes a supplemental battery relay electrically connecting to the starting-signal isolator and the PLC and a supplemental battery comprising a positive terminal electrically connecting to the supplemental battery relay. The supplemental starting system includes a positive output-terminal electrically connecting to the supplemental battery relay. When an output of the starting-signal isolator is higher than a threshold voltage, the resetting relay is configured to be in a close state and the supplemental battery relay is configured to be in a close state, so that the supplemental starting system is configured to provide electricity to one of the one or more cranking motors.

The present disclosure is also directed to a method for providing a supplemental starting system to start one or more cranking motors. The method includes receiving, by a starting-signal isolator of a supplemental starting system, wherein the starting-signal isolator is configured to connect to one or more electrical starting signal wires which provide starting signal to one or more cranking motors. The method includes when one of the one or more electrical starting signal wires has the high voltage signal, outputting, by the starting-signal isolator of the supplemental starting system, a high voltage signal and setting a resetting relay in an open state, wherein the resetting relay electrically connects to the starting-signal isolator. The method includes resetting a first programmable logic controller (PLC) electrically connects to the resetting relay and setting a supplemental battery relay in a close state, wherein the supplemental battery relay electrically connects to the starting-signal isolator and the PLC. The method includes electrically connecting a positive terminal of a supplemental battery to a positive output-terminal of the supplemental starting system; and providing electricity to start one of the one or more cranking motors.

BRIEF DESCRIPTION OF THE DRAWINGS

FIG. 14 is a schematic diagram of one implementation of the starting-signal isolator described in FIG. 12.

FIGS. 15A and 15B are embodiments of a connector for the starting-signal isolator described in FIG. 12.

FIGS. 17-18 are flow diagrams of a method for providing a supplementary starting system to start one or more cranking motors.

DETAILED DESCRIPTION OF THE DRAWINGS

The present disclosure will now be described in detail hereinafter with reference to the accompanied drawings, which form a part of the present disclosure, and which show, by way of illustration, specific examples of embodiments. Please note that the present disclosure may, however, be embodied in a variety of different forms and, therefore, the covered or claimed subject matter is intended to be construed as not being limited to any of the embodiments to be set forth below. Please also note that the present disclosure may be embodied as methods, devices, components, or systems. Accordingly, embodiments of the present disclosure may, for example, take the form of hardware, software, firmware or any combination thereof.

Throughout the specification and claims, terms may have nuanced meanings suggested or implied in context beyond an explicitly stated meaning. Likewise, the phrase "in one embodiment" or "in one implementation" as used herein does not necessarily refer to the same embodiment or implementation and the phrase "in another embodiment" or "in another implementation" as used herein does not necessarily refer to a different embodiment or implementation. It is intended, for example, that claimed subject matter includes combinations of exemplary embodiments or implementations in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" or "at least one" as used herein, depending at least in part upon context, may be used to describe any feature, structure, or characteristic in a singular sense or may be used to describe combinations of features, structures or characteristics in a plural sense. Similarly, terms, such as "a", "an", or "the", again, may be understood to convey a singular usage or to convey a plural usage, depending at least in part upon context. In addition, the term "based on" or "determined by" may be understood as not necessarily intended to convey an exclusive set of factors and may, instead, allow for existence of additional factors not necessarily expressly described, again, depending at least in part on context.

The present disclosure describes a supplemental starting system to start one or more cranking motors of one or more engines in some applications, for example but not limited to, a heavy duty vehicle or a vessel in marine applications with one or more engines.

Figure 1:
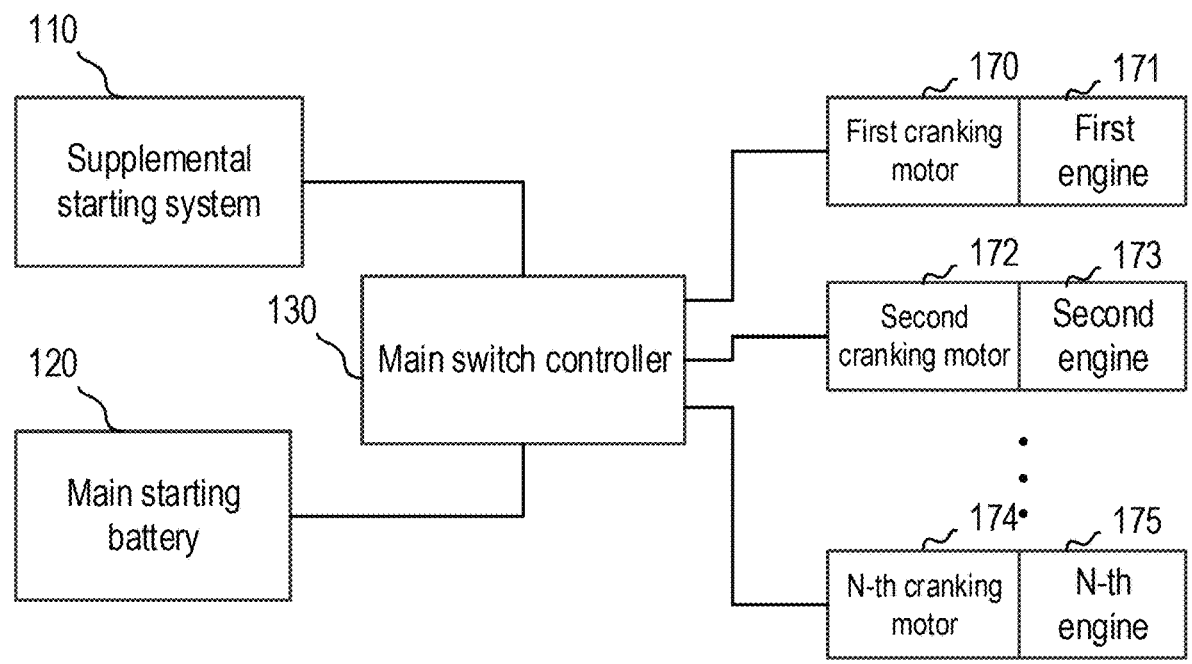
FIG. 1 is a schematic diagram of a system for starting one or more cranking motors.

In one embodiment as shown in FIG. 1, a supplemental starting system 110 may be used to provide starting power to one or more cranking motors connecting to one or more engines. A cranking motor, also known as a starter or a starter motor, is powered by electricity and is used to rotate an engine so as to initiate the engine's operation. In one implementation, the one or more cranking motors may be connected in a daisy-chain pattern. In another implementation, there may be one or a plurality of cranking motors, for example but not limited to, two, three, four, six, ten, and twelve.

The supplemental starting system 110 and a main starting battery 120 may electrically connect to a main switch controller 130. The main switch controller 130 may electrically connect to one or more cranking motors 170, 172, and 174. The one or more cranking motors 170, 172, and 174 may physically connect to their corresponding engines 171, 173, and 175, respectively. The connection between cranking motors and engines may include one or more belts or gears.

The main starting battery 120 may be a main battery of a vehicle or vessel. For example, the main starting battery 120 may be a deep-cycle lead-acid battery or Lithium-ion battery. The voltage of the main starting battery 120 may be 12V, 24V, 36V, or 48V.

The main switch controller 130 may control the connections between the supplemental starting system 110 and the main starting battery 120, and the one or more cranking motors. The main switch controller 130 may include one or more battery switches to control the connections.

Figure 2:
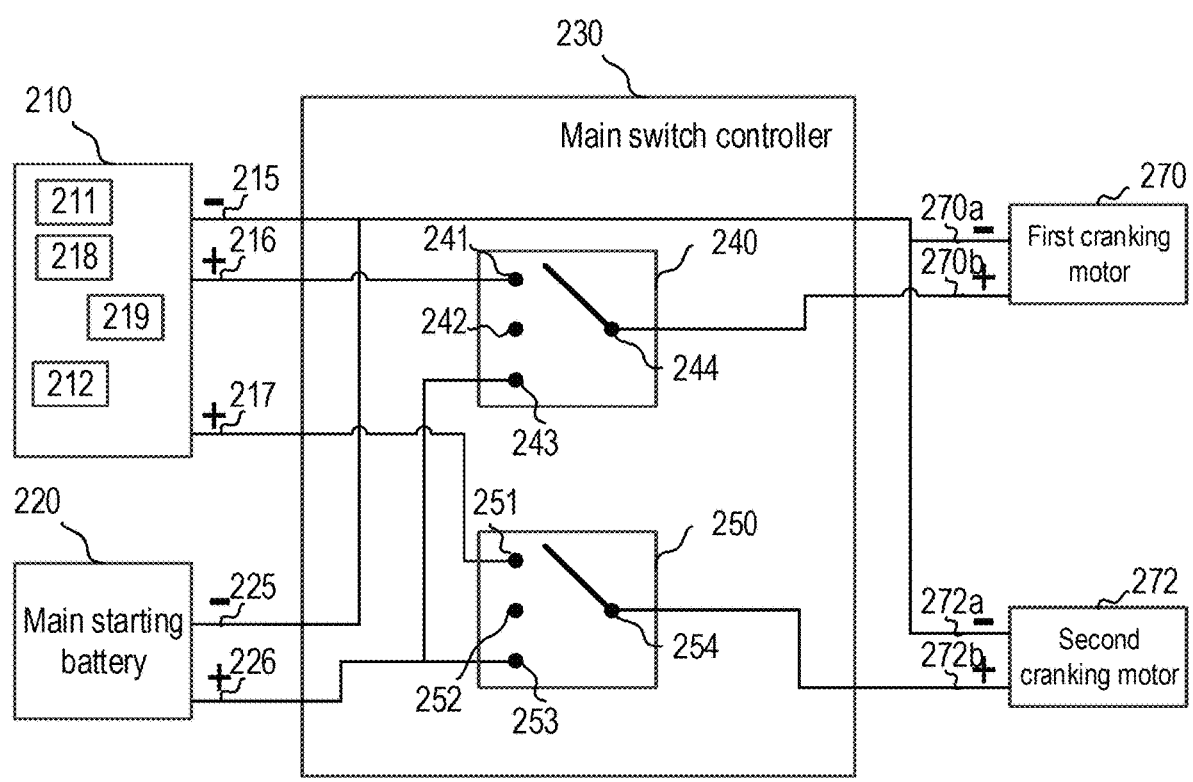
FIG. 2 is a schematic diagram of a system for starting two cranking motors.

As an example but not a limitation, one embodiment of a starting system to start two cranking motors is described in FIG. 2. The starting system may include a supplemental starting system 210, a main starting battery 220, a main switch controller 230, a first cranking motor 270, and a second cranking motor 272.

The supplemental starting system 210 may have a supplemental battery 218. Being an example but not a limitation, the supplemental battery 218 may include one or more capacitors or any other type of devices to store energy. The capacitor may include, for example but not limited to, a supercapacitor.

In one embodiment, the supplemental battery 218 may include a capacitor. The capacitor may be, for example but not limited to, a double layer capacitor or an electrochemical capacitor. For example but not limited to, in some systems, the capacitor may have a capacitance of 500 farads, a stored energy capacity of 120 kilojoules, an internal resistance at 25 degrees Celsius of 0.006 ohms. In other systems, the capacitor may, for example but not limited to, have a capacitance greater than about 149 farads, and an internal resistance at about 25 degrees Celsius preferably less than about 0.008 ohms, and more preferably less than about 0.006 ohms, and most preferably less than about 0.003 ohms. The energy storage capacity is preferably greater than 15 kJ. Such capacitors provide the advantage of delivering high currents at low temperatures and relatively low voltages because of their low internal resistance.

Though not shown, the electrical system of the vehicle or vessel may, for example but not limited to, include a generator or alternator driven by the engine when running to charge the supplemental battery 218 and/or the main starting battery 120. The charging process of the supplemental battery 218 may be monitored and/or regulated by a control unit 219 of the supplemental starting system 210. In one implementation, the control unit 219 may include a programmable logic controller (PLC) or microprocessor based charge controller (MCC). In another implementation, the control unit 219 may communicate with other components inside the supplemental starting system, and/or may communicate with the main switch controller, and/or may communicate with the cranking motors and engines.

The supplemental starting system 210 may have a first supplemental starting switch 211 and a second supplemental starting switch 212. The first supplemental starting switch 211 may control the electrical power at a first positive output-terminal 216, which may be further controlled and switched by the main switch controller 230 to electrically connect to a positive terminal 270b of a first cranking motor 270. The second supplemental starting switch 212 may control the electrical power at a second positive output-terminal 217, which may be further controlled and switched by the main switch controller 230 to electrically connect to a positive terminal 272b of a second cranking motor 272.

In another implementation, the supplemental starting system 210 may have a single supplemental starting switch, which may control the electrical power at both the first positive output-terminal and the second positive output-terminal. Optionally, when the single supplemental starting switch is in a close state, the control unit of the supplemental starting system may be configured to supply electrical power to the plurality of positive output-terminals in a sequential pattern. For example but not limited to, when the single supplemental starting switch is placed in the close state, the control unit 219 of the supplemental starting system may supply electrical power to the first positive output-terminals, so as to be configured to start the first cranking motor. The control unit 219 may constantly monitor the condition of the first cranking motor and/or the first engine to determine whether the first cranking motor and/or the first engine is successfully started, for example but not limited to, by monitoring a voltage between a positive terminal and a negative terminal of the supplemental battery 218, and/or by monitoring a voltage between the positive terminal 270b and the negative terminal 270a of the first cranking motor 270, and/or by monitoring the running condition of the first engine (for example, an engine rotational speed and an engine output torque). When the control unit determines that the first cranking motor is successfully started, the control unit may provide a first control signal to stop providing electrical power to the first positive output-terminal 216, and then the control unit may provide a second control signal to begin providing electrical power to the second positive output-terminal 217 to start the second cranking motor 272. The control unit 219 may constantly monitor the condition of the second cranking motor and/or the second engine to determine whether the second cranking motor and/or the second engine is successfully started. When the control unit determines that the second cranking motor and/or the second engine is successfully started, the control unit may provide a third control signal to stop providing electrical power to the second positive output-terminal 217. In one implementation, after the first and second cranking motors/engines are successfully started, the control unit may provide a fourth signal to begin a charging process of the supplemental battery 218.

The supplemental starting system 210 may have a single negative output-terminal 215. The negative output-terminal 215 may electrically connect to a negative terminal 270a of the first cranking motor 270 and a negative terminal 272a of the second cranking motor 272. In one implementation, the negative output-terminal 215 may be controlled by the main switch controller 230 to electrically connect to the negative terminal 270a of the first cranking motor 270 and the negative terminal 272a of the second cranking motor 272. In another implementation, the supplemental starting system 210 may have a first negative output-terminal and a second negative output-terminal, which may be controlled by the main switch controller to electrically connect to the negative terminal 270a of the first cranking motor 270 and the negative terminal 272a of the second cranking motor 272, respectively.

The main starting battery 220 may have a positive terminal 226 and a negative terminal 225. The positive terminal 226 may, via the main switch controller 230, electrically connect to the positive terminal 270b of the first cranking motor 270 and the positive terminal 272b of the second cranking motor 272. The negative terminal 225 may, via the main switch controller 230, electrically connect to the negative terminal 270a of the first cranking motor 270 and the negative terminal 272a of the second cranking motor 272.

The main switch controller 230 may include two battery switches, a first battery switch 240 and a second battery switch 250, each of which may be responsible for one of the two cranking motors/engines. In one implementation, the two battery switches 240 and 250 may be coupled, either electrically or mechanically, to an engine ignition switch. When the engine ignition switch turns on, the two battery switches may turn to a specific position, either at the same time or one-by-one in a sequential order. In another implementation, the two battery switches may be uncoupled from each other, and one battery switch may turn to a specific position independently from the other battery switch.

The first battery switch 240 may be a rotary switch or a rotary relay, and include a common pole 244, a first positon 241, a second position 242, and a third position 243. The common pole 244 may electrically connect to the positive terminal 270b of the first cranking motor 270, and may be switched to electrically connect to any one of the first, second, and third positions.

The first position 241 may electrically connect to the first positive output-terminal 216 of the supplemental starting system 210. As such, when the common pole 244 connects to the first position 241, the system is configured to use the supplemental starting system 210 to provide electric power to start the first cranking motor 270.

The second position 242 may not electrically connect to either the supplemental battery or the main starting battery. As such, when the common pole 244 connects to the second position 242, the system is configured to be in a non-starting state, wherein neither the supplemental starting system nor the main starting battery may provide electrical power to start the first cranking motor 270.

The third position 243 may electrically connect to the first positive terminal 226 of the main starting battery 220. As such, when the common pole 244 connects to the third position 243, the system is configured to use the main starting battery 220 to provide electric power to start the first cranking motor 270.

In another implementation, the first battery switch 240 may include a fourth position. The fourth position may electrically connect to both the first positive output-terminal 216 of the supplemental starting system 210 and the first positive terminal 226 of the main starting battery 220. As such, when the common pole 244 connects to the fourth position, the system is configured to use both the supplemental starting system 210 and the main starting battery 220 to provide electric power to start the first cranking motor 270. This configuration may be used under certain circumstances, for example but not limited to, the remaining stored energy of the supplemental starting system 210 and/or the main starting battery 220 is lower than a certain threshold.

The second battery switch 250 may be a rotary switch or a rotary relay, may include a common pole 254, a first positon 251, a second position 252, and a third position 253, and may electrically connect to other terminals similarly as the first battery switch 240. In another implementation, the second battery switch 250 may include a fourth position, which may connect to other terminals similar to the first battery switch 240 as described above.

Figure 3A:
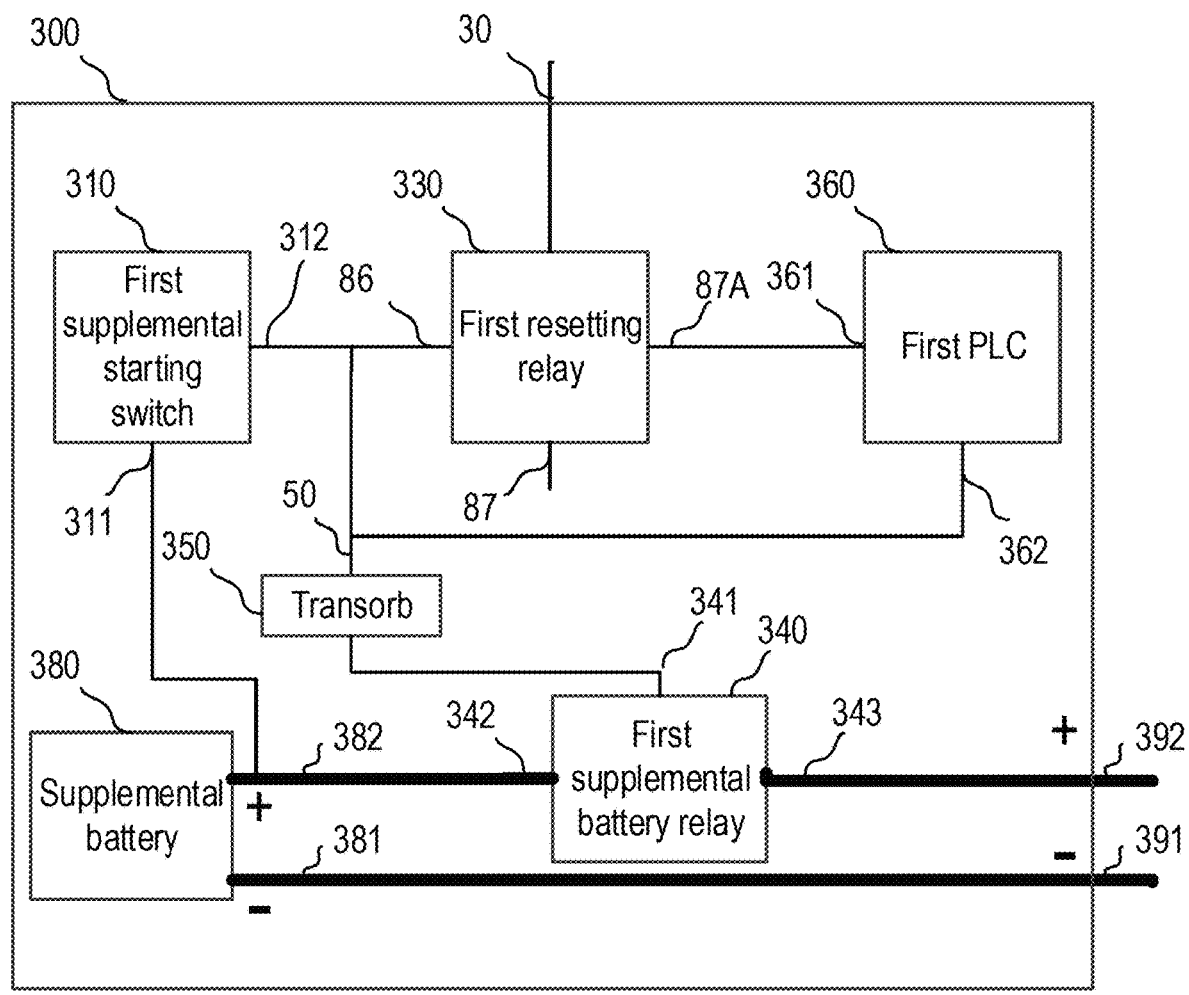
FIG. 3A is a schematic diagram of a supplemental starting system for providing supplemental power to start one or more engines.
Figure 3B:
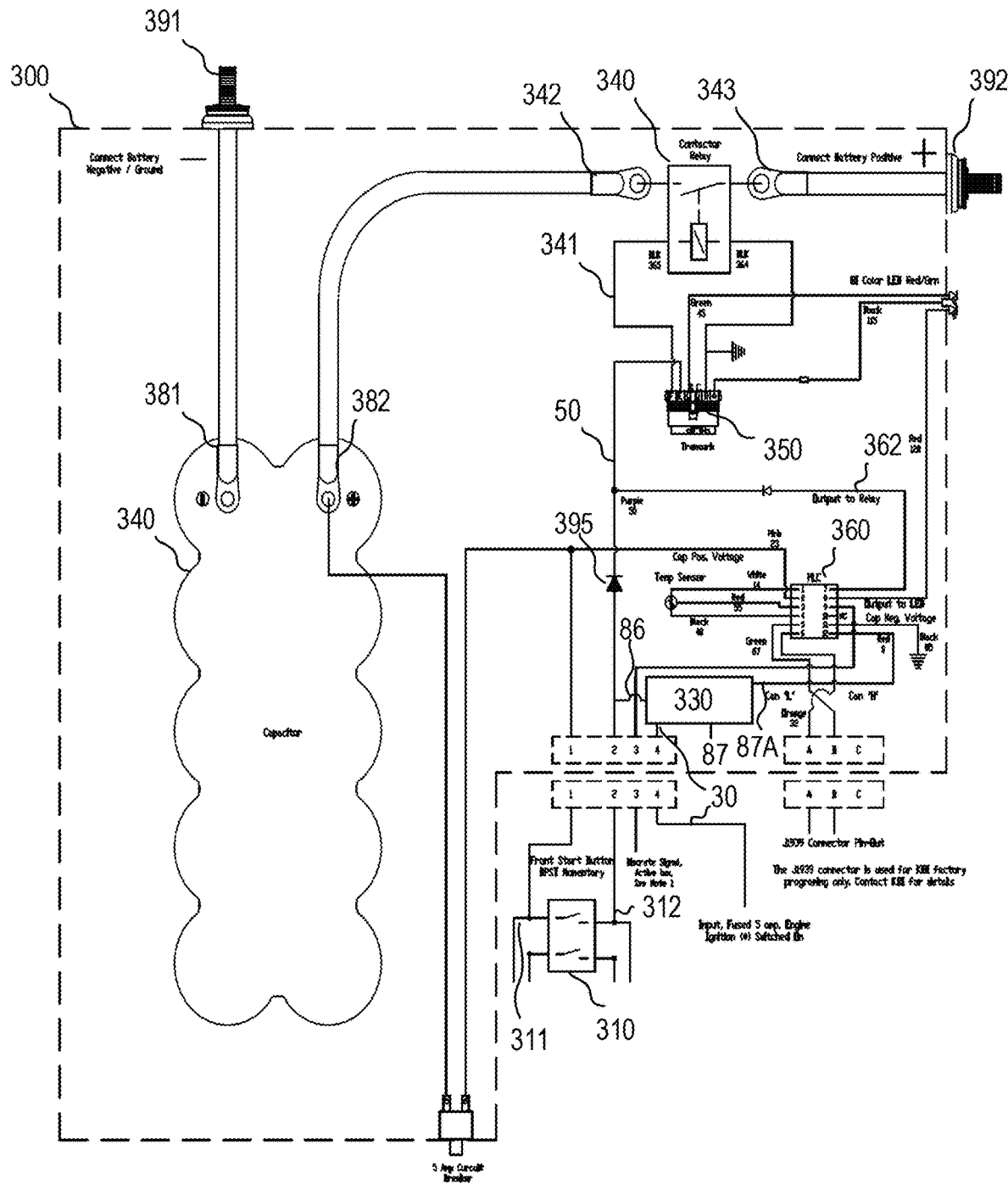
FIG. 3B is a schematic electrical diagram of a supplemental starting system for providing supplemental power to start one or more engines.

The present disclosure describes another embodiment of a supplemental starting system 300 as shown in FIGS. 3A and 3B. The supplemental starting system may include a first supplemental starting switch 310, a first resetting relay 330, a first programmable logic controller (PLC) 360, a first supplemental battery relay 340, a supplemental battery 380, a first positive output-terminal 392, and a negative output-terminal 391.

Optionally, the supplemental starting system 300 may further include a transorb 350. A transorb may be a transient voltage suppression diode, which may be used to protect sensitive electronics from voltage spikes induced by another source. The transorb will shunt excessive current when the voltage of the terminals of the transorb exceeds a certain preset level. In one implementation, the certain preset level may be a voltage higher than the voltage of the supplemental battery. For example but not limited to, the certain preset level may be 30V, 60V or 100V when the voltage of the supplemental battery is 12V or 24V.

More detailed description of a PLC controlled supplemental starting system is included in U.S. application Ser. No. 14/829,371, filed on Aug. 18, 2015 by the same Applicant as the present application, which is incorporated herein by reference in its entirety.

The resetting relay 330 may solve a drawback that the PLC 360 would sense the next engine start event, the fluctuation in voltage, and initiate an error code as a potential fault in the system. When the first supplemental starting switch 310 is depressed, the resetting relay 330 may reset the PLC, as to clear false error codes. Once the last engine has started, the PLC may take over and allow a charging process of the supplemental battery 380 to begin and/or to finish.

The first supplemental starting switch 310 may be a push button or a key switch, and may have an input pin 311 and an output pin 312. The input pin 311 may connect to a positive terminal 382 of the supplemental battery 380. When the first supplemental starting switch 310 is depressed, the first supplemental starting switch 310 is set in a close state, in which the output pin 312 may electrically connect to the input pin 311. When the first supplemental starting switch 310 is released, the first supplemental starting switch 310 is set in an open state, in which the output pin 312 may electrically disconnect from the input pin 311. The first supplemental starting switch 310 may be a double-pole single-throw (DPST) switch as shown in FIG. 3B. In another implementation, the first supplemental starting switch 310 may be a single-pole single-throw (SPST) switch or any other types of switches to fulfill the functions as described above.

In one implementation, the first resetting relay 330 may have a coil pin 86, a common pole pin 30, a normally close pin 87A, and a normally open pin 87. The first resetting relay 330 may be a relay having a normally close state, i.e, when the coil pin 86 is not energized, the common pole pin 30 electrically connect to the normally close pin 87A. The first resetting relay 330 may further have a ground pin connecting to a ground.

The coil pin 86 may electrically connect to the output pin 312 of the first supplemental starting switch 310. The common pole pin 30 may be an input terminal for the supplemental starting system, and is configured to electrically connect to an engine ignition pin and receive signal regarding whether the engine ignition switch is ON. In one implementation, when the engine ignition switch is ON, the common pole pin 30 is energized with a high voltage. The high voltage may be any voltage larger than 2V, for example but not limited to, 12V and 24V. In another implementation, when the engine ignition switch is OFF, the common pole pin 30 is configured to have a low voltage. The low voltage may be any voltage lower than 2V, for example but not limited to, 1V, 100 mV, and zero Volt.

The first PLC may have an input pin 361 electrically connecting to the normally close pin 87A, and an output pin 362 electrically connecting to an input pin of the transorb 350. When the input pin 361 is energized with a high voltage, the first PLC may be in a working state and perform its normal functions. When the input pin 361 has a low voltage, the PLC may reset and/or reboot. The low voltage may be any voltage smaller than 2V, for example but not limited to, smaller than 100 milliVolt (mV) and zero Volt.

An input pin 50 of the transorb 350 may electrically connect to the output pin 312 of the first supplemental starting switch and the output pin 362 of the first PLC 360. An output pin of the transorb 350 may electrically connect to a coil pin 341 of the first supplemental battery relay 340.

The first supplemental battery relay 340 may have the coil pin 341, a common pin 342, and a normally open pin 343. When the coil pin 341 is energized with the high voltage, the first supplemental battery relay 340 is in a close state, wherein the common pin 342 may electrically connect to the normally open pin 343. When the coil pin 341 has the low voltage or zero voltage, the first supplemental battery relay 340 is in an open state, wherein the common pin 342 may electrically disconnect from the normally open pin 343.

The common pin 342 of the first supplemental battery relay 340 may electrically connect to the positive terminal 382 of the supplemental battery 380. The normally open pin 343 may electrically connect to the first positive output-terminal 392. A negative terminal 381 of the supplemental battery 380 may electrically connect to the negative output-terminal 391.

When the first supplemental starting switch is depressed, the output pin 312 may electrically connect to the input pin 311 and may have a high voltage. The coil pin 86 of the first resetting relay 330 electrically connects to the output pin 312, so that the first resetting relay 330 is set in the open state, wherein the normally close pin 87A may electrically disconnect from the common pole pin 30. Consequently, the First PLC 360 may boot and reset. The coil pin 341 of the first supplemental battery relay 340 electrically connects to the output pin 312, so that the first supplemental battery relay is in the close state, wherein the first positive output-terminal 392 electrically connects to the positive terminal 382 of the supplemental battery 380. Therefore, under this condition, the supplemental starting system is configured to provide electric power through the first negative output-terminal and the first positive output-terminal to start a cranking motor of an engine.

When the depressed first supplemental starting switch 310 is released, the first supplemental starting switch 310 may switch to the open state and the output pin 312 may have the low voltage or zero voltage. The coil pin 86 of the first resetting relay 330 electrically connects to the output pin 312, so that the first resetting relay 330 is in the close state and the normally close pin 87A may electrically connect to the common pole pin 30. Consequently, the first PLC 360 may be in a normal working mode and perform its functions, one of which may be to initiate and/or regulate the charging process of the supplemental battery 380.

Optionally in another implementation, a diode 395 may electrically connect to the output pin 312 of the first supplemental starting switch 310, as shown in FIG. 3B. The diode 395 may allow an electrical current flowing from the first supplemental starting switch 310 to the first supplemental battery relay 340, and may block an electrical current flowing from the first supplemental battery relay 340 to the first supplemental starting switch 310.

Figure 4:
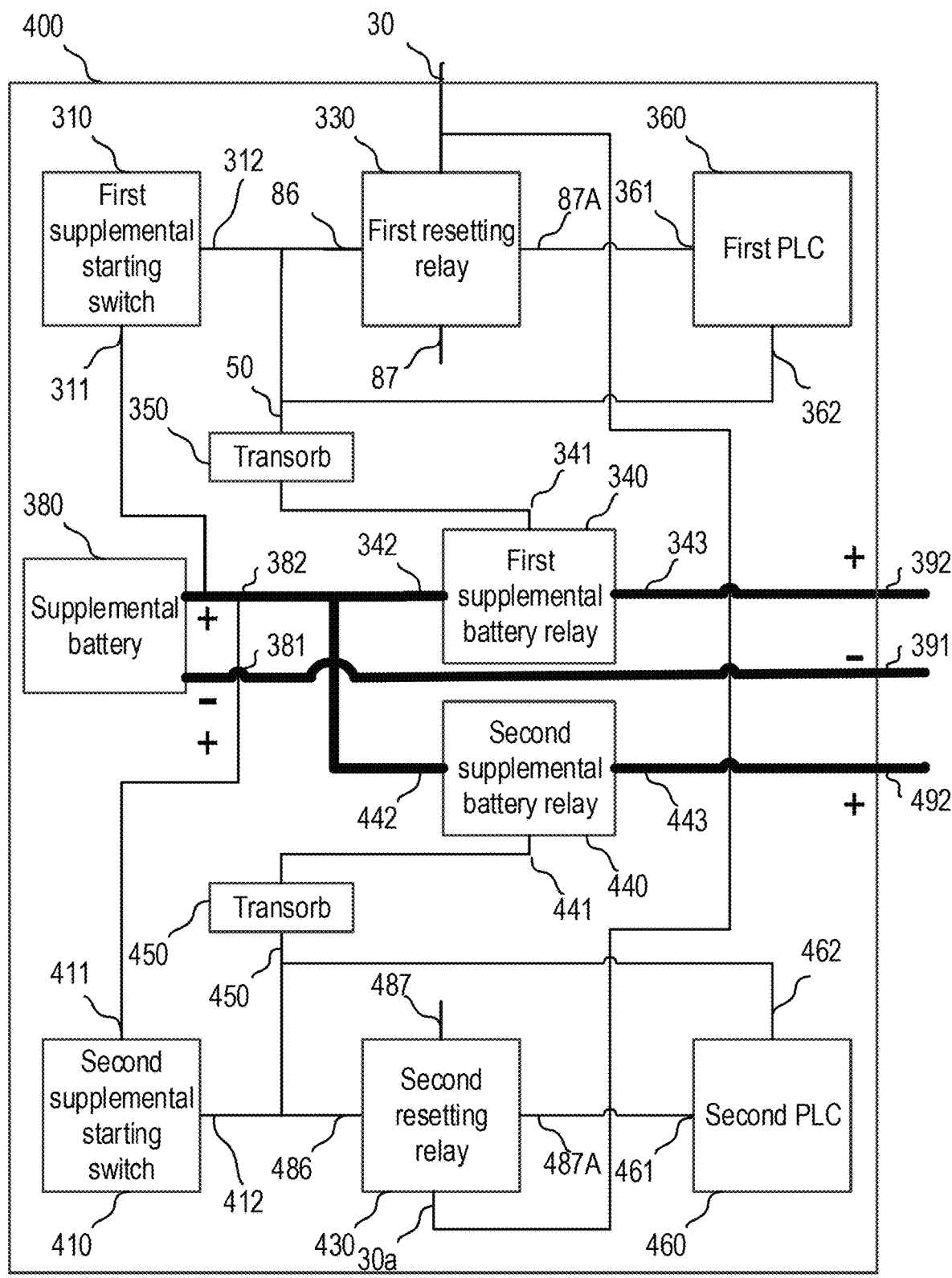
FIG. 4 is a schematic diagram of a supplemental starting system for providing supplemental power to start one or more engines.

In another embodiment, a supplemental starting system 400 may have a plurality of positive output-terminals, for example but not limited to, two positive output-terminals as shown in FIG. 4. The plurality of positive output-terminals may provide electrical power to start a plurality of cranking motors.

The supplemental starting system 400 may include a first supplemental starting switch 310, a first resetting relay 330, a first PLC 360, a first supplemental battery relay 340, a supplemental battery 380, a first positive output-terminal 392, a negative output-terminal 391, a second supplemental starting switch 410, a second resetting relay 430, a second PLC 460, a second supplemental battery relay 340, and a second positive output-terminal 492. Optionally, the supplemental starting system 400 may include a transorb 450.

Optionally in one implementation, the supplemental starting system may include one single PLC, and the first PLC and the second PLC are the same PLC, which may perform the functions of the first PLC 360 and the second PLC 460. In another implementation, the single PLC may have a first input pin electrically connecting to an output pin of the first resetting relay and a second input pin electrically connecting to an output pin of the second resetting relay.

Optionally in another implementation, the supplemental starting system may include one single resetting relay, and the first resetting relay and the second resetting relay are the same resetting relay. In another implementation, the single resetting relay may have a first input pin electrically connecting to an output pin of the first supplemental starting switch and a second input pin electrically connecting to an output pin of the second supplemental starting switch.

Optionally in another implementation, the supplemental starting system 400 may include two negative output-terminals, a first negative output-terminal in pair with the first positive output-terminal and a second negative output-terminal in pair with the second positive output-terminal.

The second supplemental starting switch 410 may be a push button or key switch, and may have an input pin 411 and an output pin 412. The input pin 411 may connect to a positive terminal 382 of the supplemental battery 380. When the second supplemental starting switch 410 is depressed, the second supplemental starting switch 410 is set in a close state. When the second supplemental starting switch 410 is released, the second supplemental starting switch 310 is set in an open state.

The second resetting relay 430 may have a coil pin 486, a common pole pin 30a, a normally close pin 487A, and a normally open pin 487. The second resetting relay 430 may be a relay having a normally close state, i.e, when the coil pin 486 has a low voltage, the common pole pin 30a electrically connect to the normally close pin 487A. The coil pin 486 may electrically connect to the output pin 412 of the second supplemental starting switch 410. The common pole pin 30a may electrically connect to the engine ignition pin and receive signal regarding whether the engine ignition switch is ON. In one implementation, when the engine ignition switch is ON, the common pole pin 30a is energized with a high voltage; when the engine ignition switch is OFF, the common pole pin 30a has a low voltage. The high voltage may be any voltage larger than 2V, for example but not limited to, 12V and 24V. The low voltage may be any voltage smaller than 2V, for example but not limited to, 1V, 100 mV, and zero Volt.

The second PLC 460 may have an input pin 461 electrically connecting to the normally close pin 487A, and an output pin 462 electrically connecting to an input pin of the transorb 450. When the input pin 461 is energized with the high voltage, the second PLC may be in a working state and perform its normal functions. When the input pin 461 is at a low voltage, the PLC may reset and/or reboot.

An input pin 450 of the transorb 450 may electrically connect to the output pin 412 of the second supplemental starting switch and the output pin 462 of the first PLC 460. An output pin of the transorb 450 may electrically connect to a coil pin 441 of the second supplemental battery relay 440.

The second supplemental battery relay 440 may have the coil pin 441, a common pin 442, and a normally open pin 443. When the coil pin 441 is energized with the high voltage, the second supplemental battery relay 440 is in a close state, wherein the common pin 442 may electrically connect to the normally open pin 443. When the coil pin 441 has the low voltage or zero voltage, the second supplemental battery relay 440 is in an open state, wherein the common pin 442 may electrically disconnect from the normally open pin 443.

The common pin 442 of the second supplemental battery relay 440 may electrically connect to the positive terminal 382 of the supplemental battery 380. The normally open pin 443 may electrically connect to the second positive output-terminal 492.

When the first supplemental starting switch 310 is depressed, the first PLC 360 may boot and reset, and the first positive output-terminal 392 may electrically connect to the positive terminal of the supplemental battery to start a first cranking motor. When the first cranking motor/engine starts and the first supplemental starting switch 310 is released, the first PLC 360 may be in a normal working mode and perform its functions. Subsequently, when the second supplemental starting switch 410 is depressed, the second PLC 360 may boot and reset, and the second positive output-terminal 392 may electrically connect to the positive terminal of the supplemental battery to start a second cranking motor. When the second cranking motor/engine starts and the second supplemental starting switch 410 is released, the second PLC 460 may be in a normal working mode and perform its functions.

Figure 5:
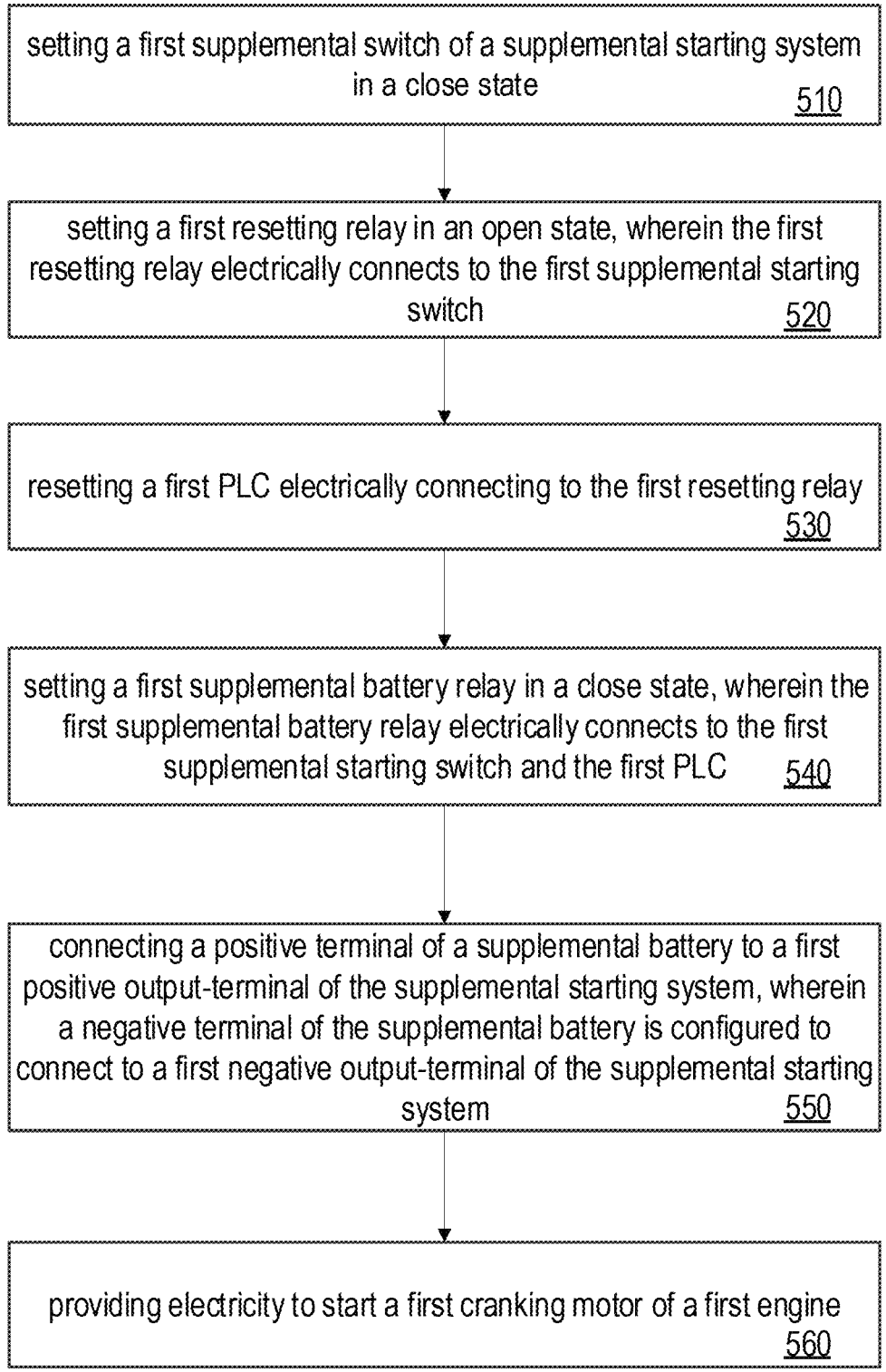
FIGS. 5-7 are flow diagrams of a method for providing a supplementary starting system to start at least one cranking motor.

The present disclosure also describe a method for providing a supplementary starting system to start one or more cranking motors. The method may include one or more of the following steps, as shown in FIG. 5. The supplemental starting system may be either one of the supplemental starting systems described above or a combination of any portion of one or more of the supplemental starting systems described above.

Step 510: setting a first supplemental switch of a supplemental starting system in a close state. The supplemental starting system may include the first supplemental switch.

Step 520: setting a first resetting relay in an open state, wherein the first resetting relay electrically connects to the first supplemental starting switch. The first resetting relay may have a coil pin electrically connecting to an output pin of the first supplemental starting switch. In one implementation, when the first supplemental switch of the supplemental starting system is in the close state, the first resetting relay is set in the open state.

Step 530: resetting a first PLC electrically connecting to the first resetting relay. The first PLC may have an input pin electrically connecting to an output pin of the first resetting relay. In one implementation, when the first resetting relay is in the open state, the output pin of the first resetting relay may reset or reboot the first PLC.

Step 540: setting a first supplemental battery relay in a close state, wherein the first supplemental battery relay electrically connects to the first supplemental starting switch and the first PLC. The first supplemental battery relay may have a coil pin electrically connecting to the output pin of the first supplemental starting switch and an output pin of the first PLC. In one implementation, when the first supplemental starting switch is in the close state, the first supplemental battery relay is set in the close state.

Step 550: electrically connecting a positive terminal of a supplemental battery to a first positive output-terminal of the supplemental starting system, wherein a negative terminal of the supplemental battery is configured to connect to a first negative output-terminal of the supplemental starting system. The first supplemental battery relay may include a common pin electrically connecting to the positive terminal of the supplemental battery of the supplemental starting system and a normally open pin electrically connecting to a first positive output-terminal of the supplemental starting system. In one implementation, when the first supplemental battery relay is set in the close state, the first positive output-terminal may electrically connect to the positive terminal of the supplemental battery.

Step 560: providing electricity to start a first cranking motor of a first engine, wherein a positive terminal of the first cranking motor is configured to connect to the first positive output-terminal, and a negative terminal of the first cranking motor is configured to connect to the first negative output-terminal.

Figure 6:
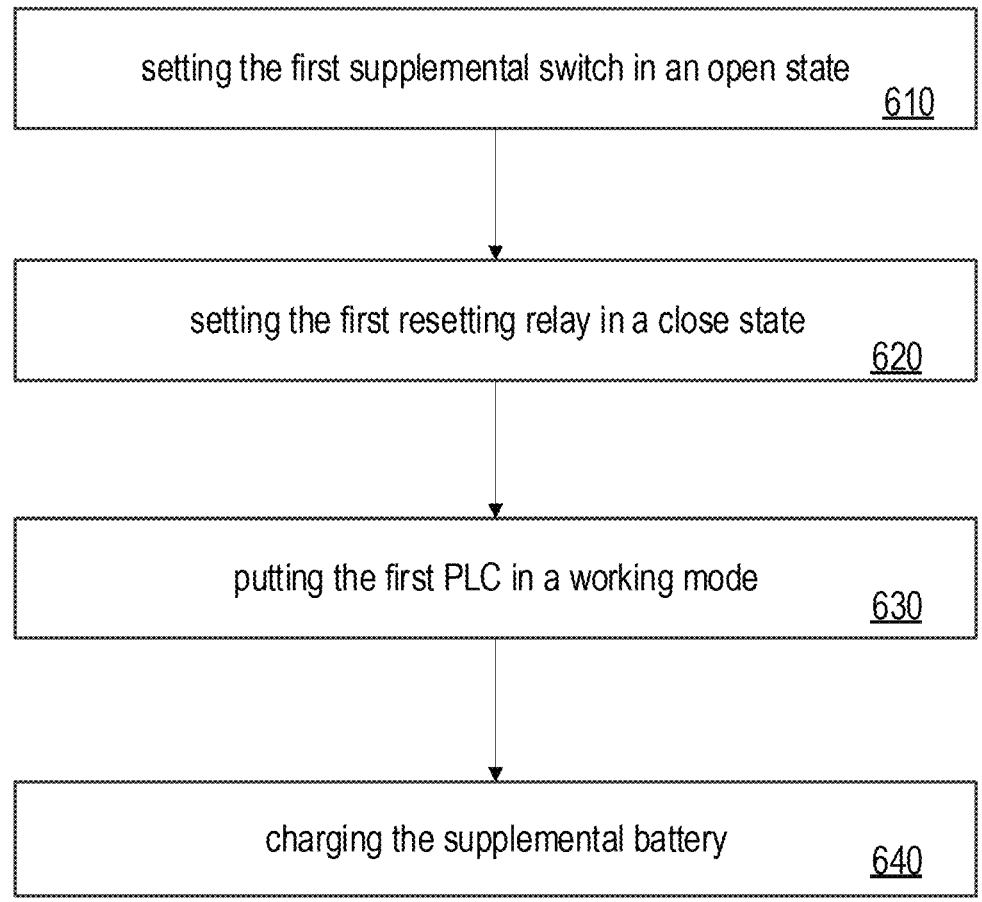

The present disclosure describes the method further including one or more of the following steps, as shown in FIG. 6.

Step 610: setting the first supplemental switch in an open state. In one implementation, when the first supplemental switch is set in the open state, the output pin of the first supplemental switch may electrically disconnect from an input pin of the first supplemental switch.

Step 620: setting the first resetting relay in a close state. In one implementation, when the first supplemental switch is set in the open state, the first resetting relay is set in the close state.

Step 630: putting the first PLC in a working mode. In one implementation, when the first resetting relay is set in the close state, the first PLC is in the working mode.

Step 640: charging the supplemental battery. In one implementation, when the first PLC is in the working mode, PLC may perform its functions, for example but not limited to, initiating a charging process of the supplemental battery; regulating a current, a voltage, a time duration of the charging process of the supplemental battery; monitoring charging conditions; and monitoring a temperature of the supplemental battery.

Figure 7:
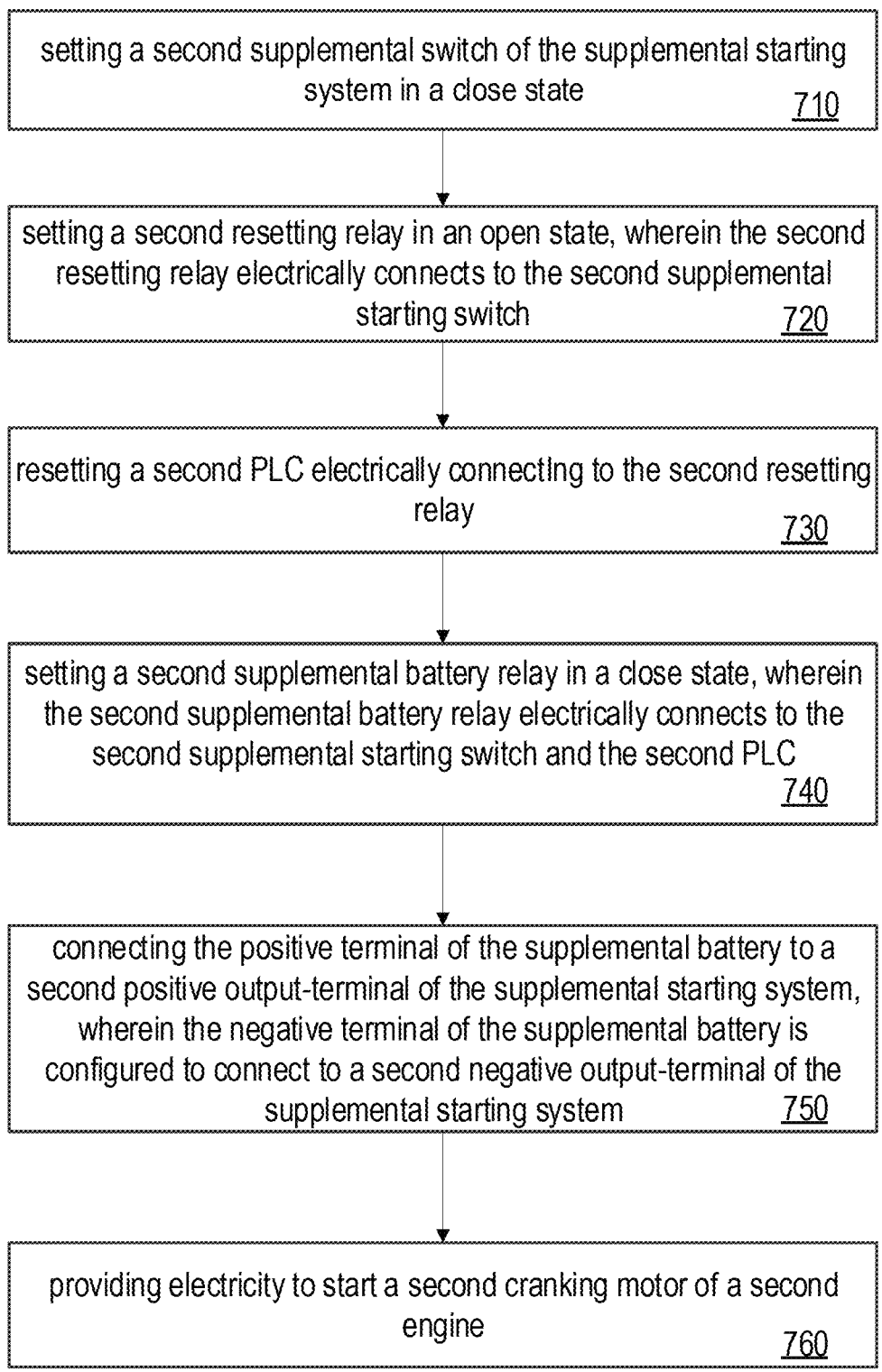

The present disclosure describes that the method may further include one or more of the following steps, as shown in FIG. 7.

Step 710: setting a second supplemental switch of the supplemental starting system in a close state.

Step 720: setting a second resetting relay in an open state, wherein the second resetting relay electrically connects to the second supplemental starting switch. The second resetting relay may have a coil pin electrically connecting to an output pin of the second supplemental starting switch. In one implementation, when the second supplemental switch of the supplemental starting system is in the close state, the second resetting relay is set in the open state.

Step 730: resetting a second PLC electrically connecting to the second resetting relay. The second PLC may have an input pin electrically connecting to an output pin of the second resetting relay. In one implementation, when the second resetting relay is in the open state, the output pin of the second resetting relay may reset the second PLC.

Step 740: setting a second supplemental battery relay in a close state, wherein the second supplemental battery relay electrically connects to the second supplemental starting switch and the second PLC. The second supplemental battery relay may have a coil pin electrically connecting to the output pin of the second supplemental starting switch and an output pin of the second PLC. In one implementation, when the second supplemental starting switch is in the close state, the second supplemental battery relay is set in the close state.

Step 750: electrically connecting the positive terminal of the supplemental battery to a second positive output-terminal of the supplemental starting system, wherein a negative terminal of the supplemental battery is configured to connect to a second negative output-terminal of the supplemental starting system. The second supplemental battery relay may include a common pin electrically connecting to the positive terminal of the supplemental battery of the supplemental starting system and a normally open pin electrically connecting to a second positive output-terminal of the supplemental starting system. In one implementation, when the second supplemental battery relay is set in the close state, the second positive output-terminal may electrically connect to the positive terminal of the supplemental battery.

Step 760: providing electricity to start a second cranking motor of a second engine, wherein a positive terminal of the second cranking motor is configured to connect to the second positive output-terminal, and a negative terminal of the second cranking motor is configured to connect to the negative output-terminal.

Figure 8:
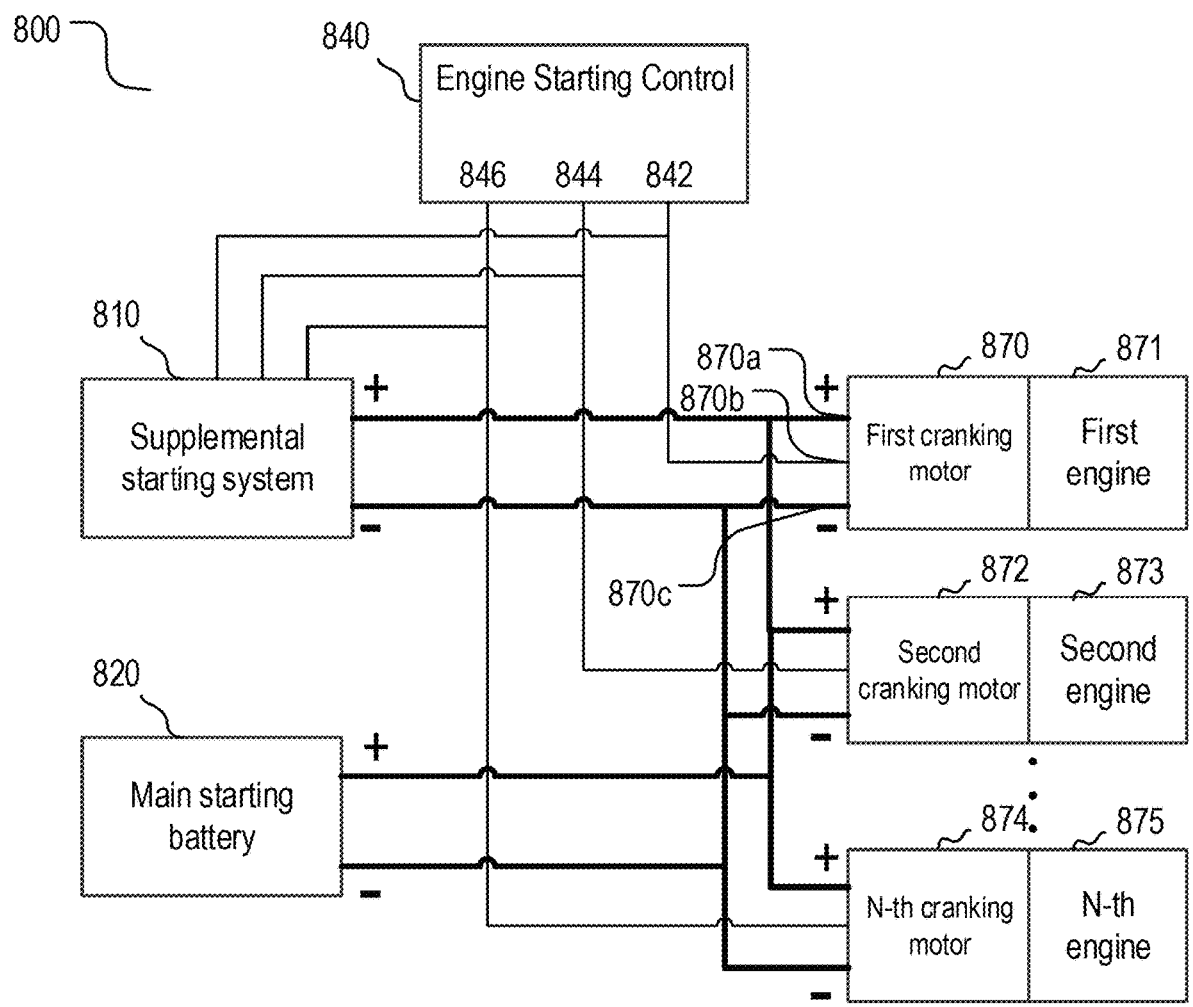
FIG. 8 is a schematic diagram of one embodiment for providing supplemental power to one or more cranking motors.

In another embodiment as shown in FIG. 8, a system 800 may include a supplemental starting system 810, a main starting battery 820, an engine starting control 840, and one or more cranking motors connecting to one or more engines. The engine starting control 840 may output one or more control signal (842, 844, and 846) to control the starting of the one or more cranking motors (870, 872, and 874), respectively. In one implementation, the engine starting control may receive electrical power from the main starting battery or another separate battery.

Referring to FIG. 8, the supplemental starting system 810 may be used to provide starting power, as a supplemental power source, to one or more cranking motors (870, 872, and 874) connecting to one or more engines (878, 873, and 875). A cranking motor, also known as a starter or a starter motor, is powered by electricity and is used to rotate an engine so as to initiate the engine's operation. In one implementation, the one or more cranking motors may be connected in a daisy-chain pattern. In another implementation, there may be one or a plurality of cranking motors, for example but not limited to, one, two, three, four, five, six, seven, eight, ten, and twelve.

The cranking motor 870 may include three terminals, a positive power terminal 870a, a control signal terminal 870b, and a negative power terminal 870c. The positive power terminal 870a may be configured to electrically connect to a positive terminal of the main starting battery 820 and/or a positive terminal of the supplemental starting system 810. The negative power terminal 870c may be configured to electrically connect to a negative terminal of the main starting battery 820 and/or a negative terminal of the supplemental starting system 810. In another implementation, for example in FIG. 9, the negative power terminal 870c may be configured to electrically connect to a ground, the negative terminal of the main starting battery 820 may be also configured to connect to the ground, and the negative terminal of the supplemental starting system 810 may be also configured to connect to the ground.

The control signal terminal 870b may be configured to electrically connect to one of the outputs from the engine starting control 840. When a positive electrical voltage is received on the control signal terminal 870b, the first cranking motor 870 may be configured to begin cranking. In one implementation, the control signal terminal 870b may control a solenoid/magnetic switch to connect an electric motor to the positive power terminal 870a so as to turn on the cranking motor. In one implementation, the control signal terminal 870b may include an "S" terminal of a cranking motor.

Referring to FIG. 8, each of the outputs (842, 844, and 846) of the engine starting control 840 may connect to a control signal terminal of each of the one or more cranking motors (870, 872, and 874, respectively). In one implementation, the engine starting control 840 may be configured to turn on the outputs in a sequential manner, so that one cranking motor may begin cranking after another cranking motor finishes cranking.

Referring to FIG. 8, the outputs (842, 844, and 846) of the engine starting control 840 may feed into the supplemental starting system 810. The power from the outputs of the engine starting control 840 and/or the control signal terminals of the cranking motors may be used as signal. In another implementation, the power from the outputs of the engine starting control 840 and/or the control signal terminals of the cranking motors may be provide power to start the supplemental starting system 810. To prevent feedback or interference of one starting cranking motor/engine to other cranking motors/engines, an isolator may be used to isolate the control signals from each cranking motor.

Figure 9:
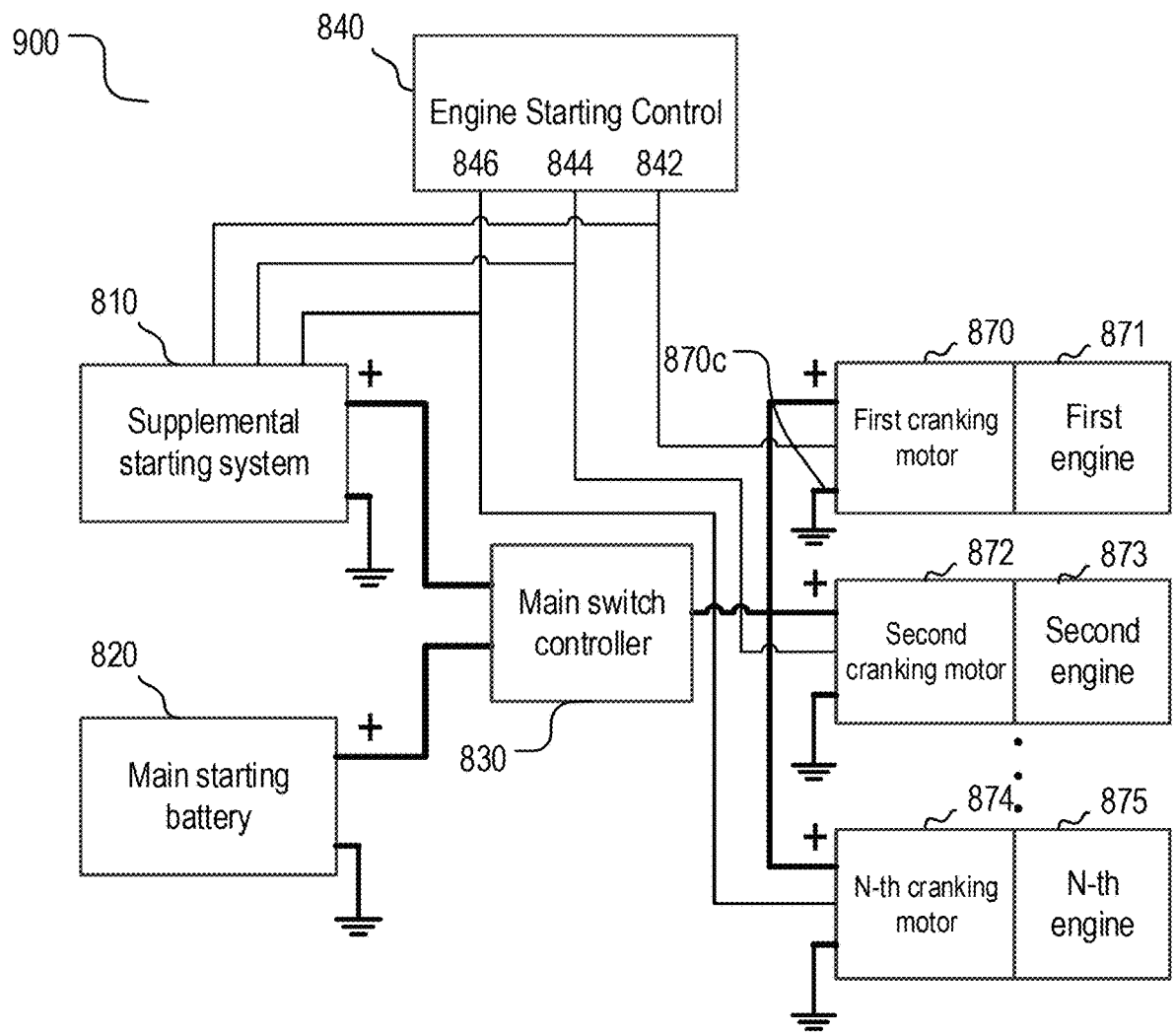
FIG. 9 is a schematic diagram of another embodiment for providing supplemental power to one or more cranking motors.

Referring to FIG. 9, a system 900 may optionally include a main switch controller 830, so that an operator may select between the main starting battery 820 and the supplemental starting system 810 to provide power to the one or more cranking motors. In another implementation, the main switch controller may be configured so that an operator may select between the main starting battery 820, the supplemental starting system 810, or both the main starting battery 820 and the supplemental starting system 810 to provide power to the one or more cranking motors.

The main switch controller 830 may control the connections between the supplemental starting system 810 and the main starting battery 820, and the cranking motors. The main switch controller 830 may include one or more battery switches to control the connections.

Figure 10A:
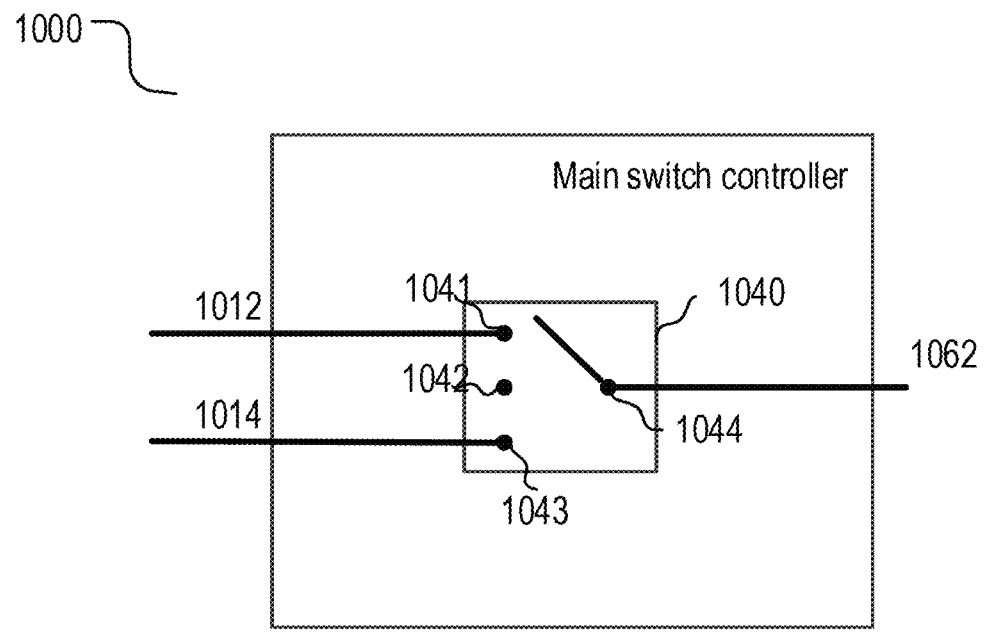
FIG. 10A is a schematic diagram of one embodiment for a main switch controller.

As an example but not a limitation, one embodiment of a main switch controller is described in FIG. 10A. The main switch controller 1000 may include a rotary switch or a rotary relay 1040. The rotary switch may include a common pole and two or more positions. In one implementation, the rotary switch 1040 may include a common pole 1044, a first position 1041, a second position 1042, and a third position 1043. The common pole 1044 may electrically connect to an output 1062 of the main switch controller, and the output 1062 may be configured to electrically connect to positive terminals of the cranking motors.

The first position 1041 of the rotary switch 1040 may electrically connect to an input 1012 of the main switch controller 1000, which may be configured to connect to a positive terminal of the supplemental starting system. As such, when the common pole 1044 connects to the first position 1041, the system is configured to use the supplemental starting system to provide electric power to start the cranking motor.

The second position 1042 of the rotary switch 1040 may not electrically connect to either the supplemental battery or the main starting battery. As such, when the common pole 1044 connects to the second position 1042, the system is configured to be in a non-starting state, wherein neither the supplemental starting system nor the main starting battery may provide electrical power to start the cranking motor.

The third position 1043 of the rotary switch 1040 may electrically connect to another input 1014 of the rotary switch 1040, which may be configured to connect to a positive terminal of the main starting battery. As such, when the common pole 1044 connects to the third position 1043, the system is configured to use the main starting battery to provide electric power to start the cranking motor.

Figure 10B:
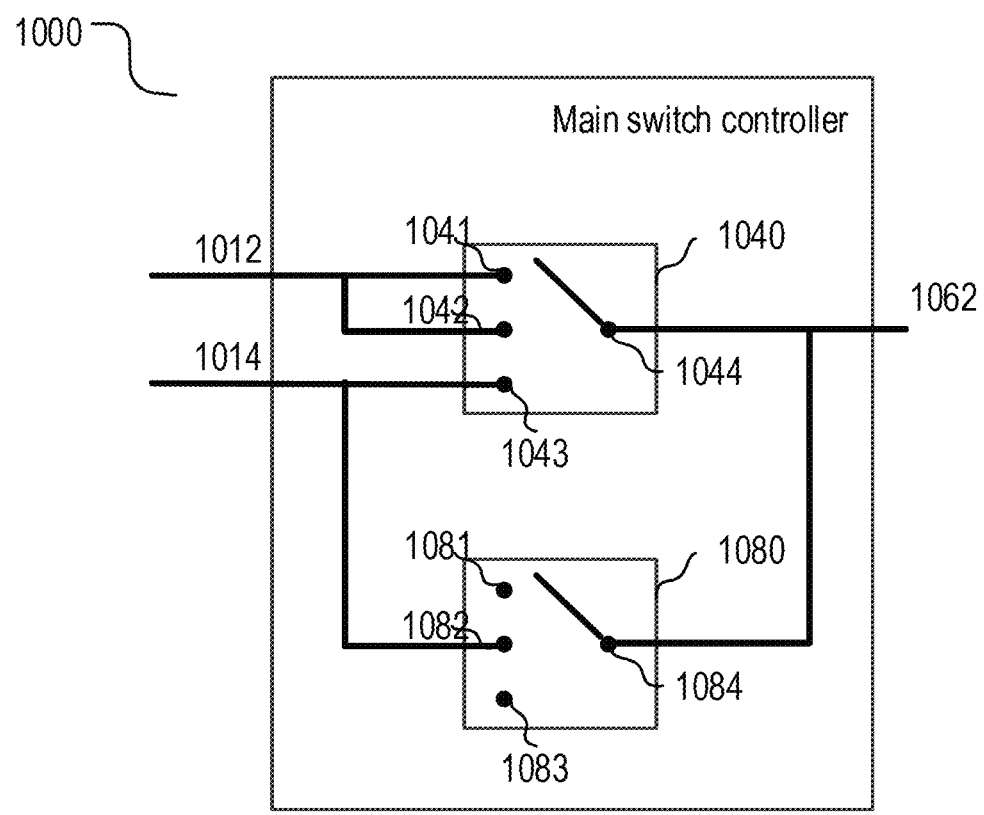
FIG. 10B is a schematic diagram of another embodiment for a main switch controller.

One embodiment of a main switch controller is shown in FIG. 10B. The main switch controller 1000 may include two rotary switches/relays 1040 and 1080. any of the two rotary switches may include one or more positions. For example, the rotary switch 1040 may include a common pole 1044, a first position 1041, a second position 1042, and a third position 1043. The rotary switch 1080 may include a common pole 1084, a first position 1081, a second position 1082, and a third position 1083. The common poles 1044 and 1084 may electrically connect to an output 1062 of the main switch controller, and the output 1062 may be configured to electrically connect to positive terminals of the cranking motors.

Referring to FIG. 10B, the first position 1041 and the second position 1042 of the rotary switch 1040 may electrically connect to a first input 1012 of the main switch controller 1000, which may be configured to connect to a positive terminal of a supplemental starting system. The third position 1043 of the rotary switch 1040 may electrically connect to a second input 1014 of the rotary switch 1040, which may be configured to connect to a positive terminal of a main starting battery. The second position 1082 of the rotary switch 1080 may electrically connect to the second input 1014, which may be configured to connect to the positive terminal of the main starting battery.

Optionally, a main switch controller may be configured to select power from a first input source ONLY, a second input source ONLY, or both the first and second input sources at the same time. The option of both the first and second input sources at the same time may have the benefit in circumstances where the first input source or the second input source alone does not have enough power to start a cranking motor.

In one implementation of FIG. 10B, the two rotary switches (1040 and 1080) may be uncoupled so that they may be independently controlled by a user.

For example, the second rotary switch 1080 may connect to the first position 1081 or the third position 1083, and then, a user may switch the first rotary switch 1040 to select power. The power may be from a supplemental starting system via a first input 1012 when the first rotary switch 1040 connects to the first position 1041 or the second position 1042; and the power may be from a main starting battery via the second input 1014 when the first rotary switch 1040 connects to the third position 1041.

For another example, the second rotary switch 1080 may connect to the second position 1082, and then, the user may switch the first rotary switch 1040 to select the power. The power may be from both the supplemental starting system and the main starting battery when the first rotary switch 1040 connects to the first position 1041 or the second position 1042; and the power may be from the main starting battery when the first rotary switch 1040 connects to the third position 1041.

In another implementation of FIG. 10B, the two rotary switches (1040 and 1080) may be mechanically coupled to each other and configured to be switched to a same corresponding position at the same time, so that a user may switch the rotary switches to select the power. As such, when the two rotary switches (1040 and 1080) connects to their corresponding first positions (1041 and 1081), respectively, the power may be from the supplemental starting system via the first input 1012. When the two rotary switches (1040 and 1080) connects to their corresponding second positions (1042 and 1082), respectively, the power may be from both the supplemental starting system and the main starting battery via the first input 1012 and the second input 1014, respectively. When the two rotary switches (1040 and 1080) connects to their corresponding third positions (1043 and 1083), respectively, the power may be from the main starting battery via the second input 1014.

Figure 11:
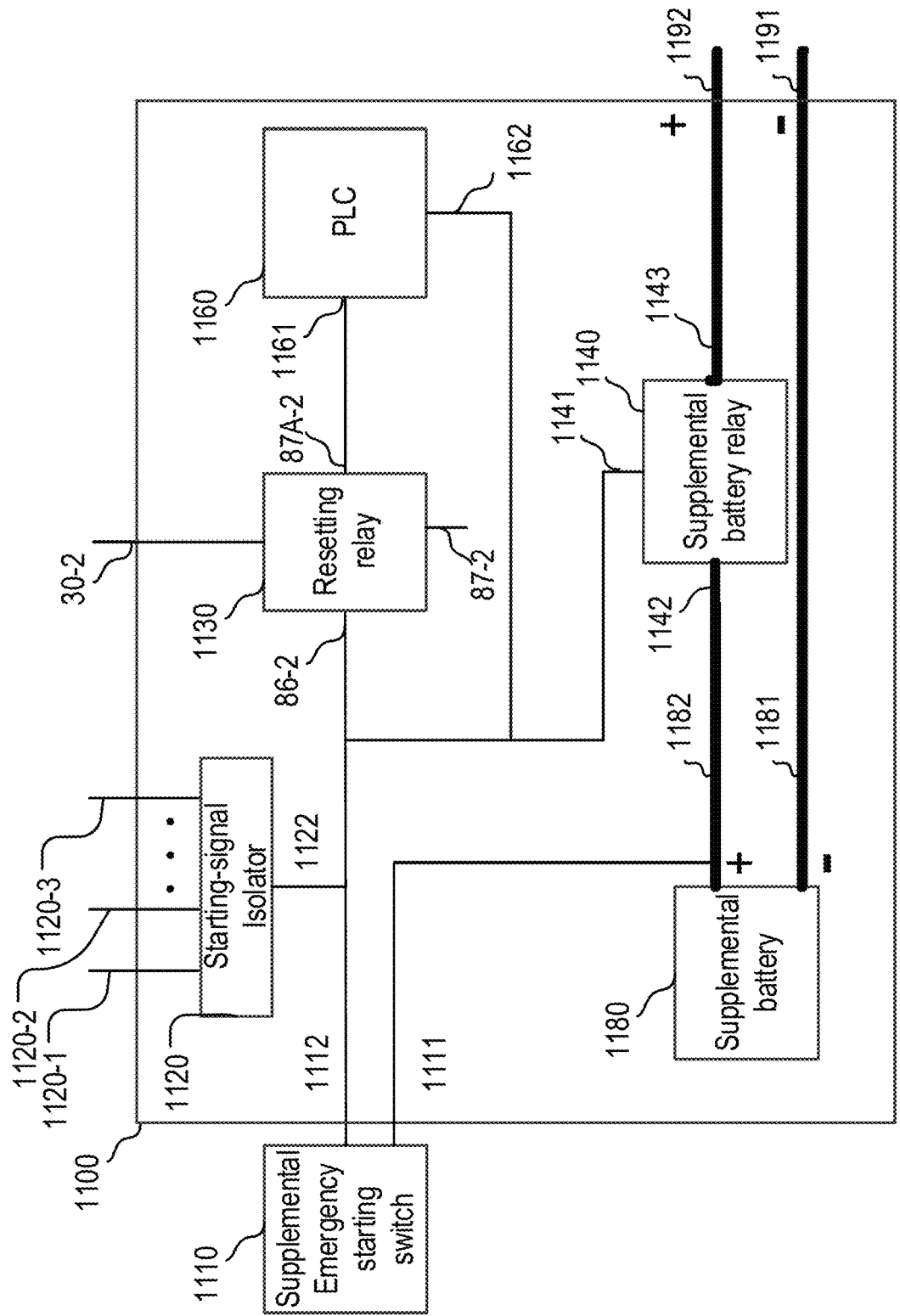
FIG. 11 is a schematic diagram of one embodiment of a supplemental starting system for providing supplemental power to start one or more cranking motors.

The present disclosure describes one embodiment of a supplemental starting system 1100 as shown in FIG. 11. The supplemental starting system may include a starting-signal isolator 1120, a resetting relay 1130, a programmable logic controller (PLC) 1160, a supplemental battery relay 1140, a supplemental battery 1180, a positive output-terminal 1192, and a negative output-terminal 391. In another implementation, the supplemental starting system may include a portion of the above components. More detailed description of a PLC controlled supplemental starting system is included in U.S. application Ser. No. 14/829,371 filed on Aug. 18, 2015 by the same Applicant as the present application and U.S. Provisional Application No. 62/806,177 filed on Feb. 15, 2019 by the same Applicant as the present application, both of which are incorporated herein by references in their entireties.

The starting-signal isolator 1120 may include one or more input terminals (1120-1, 1120-2, and 1120-3) and an output terminal 1122. Each of the one or more input terminals may be configured to connect to one of the output signals from an engine starting control. The starting-signal isolator 1120 may output positive signal when one of input terminals has positive signal. The starting-signal isolator 1120 may also isolate the one or more input terminals from each other so as to decrease interference signal between the input terminals. In one implementation, the positive signal may include a voltage larger than a predetermined threshold voltage. The predetermined threshold voltage may be 1V, 2V, or 5V.

The resetting relay 1130 may solve a drawback that the PLC 1160 would sense the engine start event, the fluctuation in voltage, and initiate an error code as a potential fault in the system.

In one implementation, the resetting relay 1130 may have a coil pin 86-2, a common pole pin 30-2, a normally close pin 87A-2, and a normally open pin 87-2. The resetting relay 1130 may be a relay having a normally close state, i.e, when the coil pin 86-2 is not energized, the common pole pin 30-2 electrically connect to the normally close pin 87A-2. The resetting relay 1130 may further have a ground pin connecting to a ground.

The coil pin 86-2 may electrically connect to the output pin 1122 of the starting-signal isolator 1120. Optionally, the common pole pin 30-2 may be an input terminal for the supplemental starting system, and is configured to electrically connect to an engine ignition pin and receive signal regarding whether the engine ignition switch is ON. In one implementation, when the engine ignition switch is ON, the common pole pin 30-2 is energized with a high voltage. The high voltage may be any voltage larger than a predetermined threshold voltage. For example but not limited to, the threshold voltage may be 1V or 2V, and the high voltage may be 12V or 24V. In another implementation, when the engine ignition switch is OFF, the common pole pin 30-2 is configured to have a low voltage. The low voltage may be any voltage no larger than 1V or 2V, for example but not limited to, 1V, 100 milliVolt (mV), and zero Volt.

Referring to FIG. 11, the PLC 1160 may have an input pin 1161 electrically connecting to the normally close pin 87A-2 of the resetting relay 1130, and an output pin 1162 electrically connecting to a coil pin 1141 of the supplemental battery relay 1140. When the input pin 1161 is energized with a high voltage, the PLC may be in a working state and perform its normal functions. When the input pin 1161 has a low voltage, the PLC may reset and/or reboot. The low voltage may be any voltage no larger than 1V or 2V, for example but not limited to, smaller than 100 milliVolt (mV) and zero Volt. When the PLC resets and/or reboots, the PLC may clear false error codes. Once the last engine has started, the PLC may take over and allow a charging process of the supplemental battery 1180 to begin and/or to end a charging process of the supplemental battery 1180 when a predetermined charging condition is met.

The supplemental battery relay 1140 may have the coil pin 1141, a common pin 1142, and a normally open pin 1143. When the coil pin 1141 is energized with the high voltage, the supplemental battery relay 1140 is in a close state, wherein the common pin 1142 may electrically connect to the normally open pin 1143. When the coil pin 1141 has the low voltage or zero voltage, the supplemental battery relay 1140 is in an open state, wherein the common pin 1142 may electrically disconnect from the normally open pin 1143.

Referring to FIG. 11, the common pin 1142 of the supplemental battery relay 1140 may electrically connect to the positive terminal 1182 of the supplemental battery 1180. The normally open pin 1143 may electrically connect to the positive output-terminal 1192. A negative terminal 1181 of the supplemental battery 1180 may electrically connect to the negative output-terminal 1191. In another implementation, the negative terminal 1181 of the supplemental battery 1180 may electrically connect to a ground of the system.

Optionally, the supplemental starting system 1100 may include a supplemental emergency starting switch 1110, which may control a connection of electrical power from a terminal 1111 and a terminal 1112. The terminal 1111 may connect to the positive terminal of the supplemental battery, and the terminal 1112 is configured to connect to the coil pin 1141 of the supplemental battery relay 1140.

In one implementation, the supplemental emergency starting switch 1110 may be a push button or a key switch, and may have an input pin 1111 and an output pin 1112. The input pin 1111 may connect to a positive terminal 1182 of the supplemental battery 1180. When the supplemental emergency starting switch 1110 is depressed, the supplemental emergency starting switch 1110 is set in a close state, in which the output pin 1112 may electrically connect to the input pin 1111. When the supplemental emergency starting switch 1110 is released, the supplemental emergency starting switch 1110 is set in an open state, in which the output pin 1112 may electrically disconnect from the input pin 1111. The supplemental emergency starting switch 1110 may be a double-pole single-throw (DPST), a single-pole single-throw (SPST) switch, or any other types of switches to fulfill the functions as described above.

Therefore, when the main battery power is insufficient, is too weak to enable a starting-signal from the engine starting control, or is unable to provide adequate power to the control signal terminal of a cranking motor, the supplemental emergency starting switch 1110 may be pressed to supply power from the supplemental battery 1180 to enable the system to start.

Optionally, a transorb may be electrically disposed on the coil pin 1141 of the supplemental battery relay 1140. A transorb may be a transient voltage suppression diode, which may be used to protect sensitive electronics from voltage spikes induced by another source. The transorb will shunt excessive current when the voltage of the terminals of the transorb exceeds a certain preset level. In one implementation, the certain preset level may be a voltage higher than the voltage of the supplemental battery. For example but not limited to, the certain preset level may be 30V, 60V or 100V when the voltage of the supplemental battery is 12V or 24V.

Figure 12:
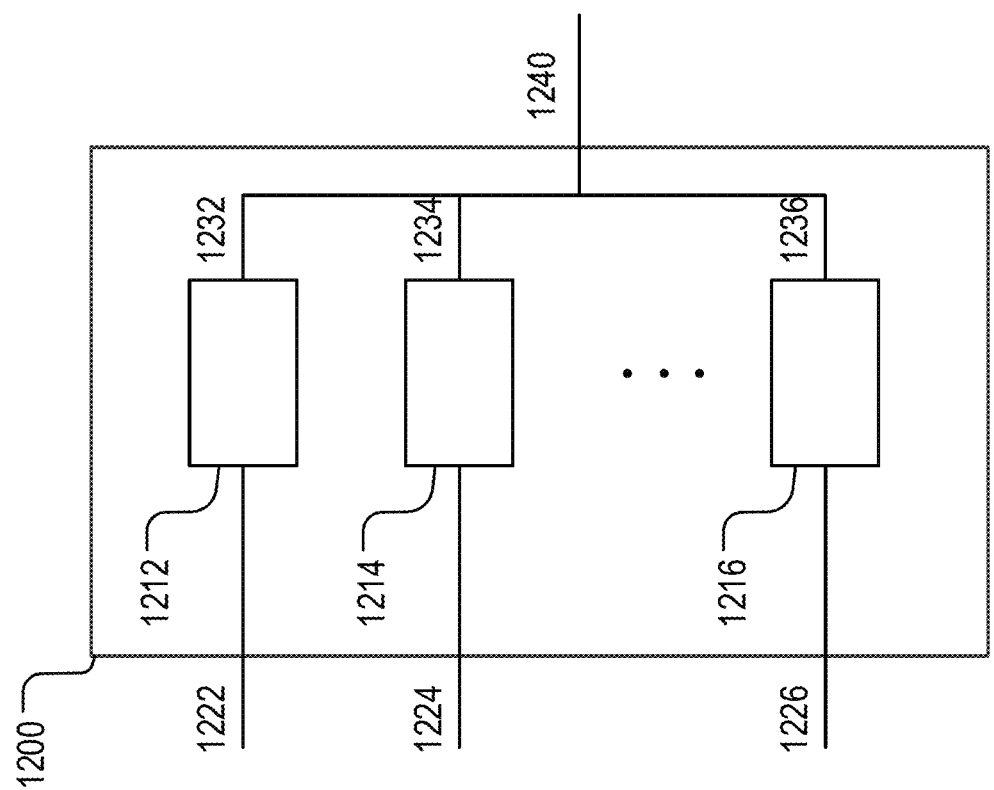
FIG. 12 is a schematic diagram of one embodiment of a starting-signal isolator.

FIG. 12 describes an embodiment of a starting-signal isolator 1200. For each input, the starting-signal isolator 1200 may include an isolating device, and the outputs from all isolating devices may be configured to connect to an output 1240 of the starting-signal isolator 1200. The isolating device may allow signals passing from its input terminal to output terminal, but may block signals passing from its output terminal to input terminal. Therefore, the isolating device may block feedback signals.

In one implementation, the starting-signal isolator 1200 may include one or more inputs (1222, 1224, and 1226), and their corresponding isolating devices (1212, 1214, and 1216, respectively). For each isolating devices (1212, 1214, or 1216), its corresponding outputs (1232, 1234, or 1236, respectively) may connect to the output 1240 of the starting-signal isolator 1200. Therefore, when any of the inputs (1222, 1224, and 1226) has a high voltage, the output 1240 of the starting-signal isolator 1200 may have a high voltage.

Figure 13:
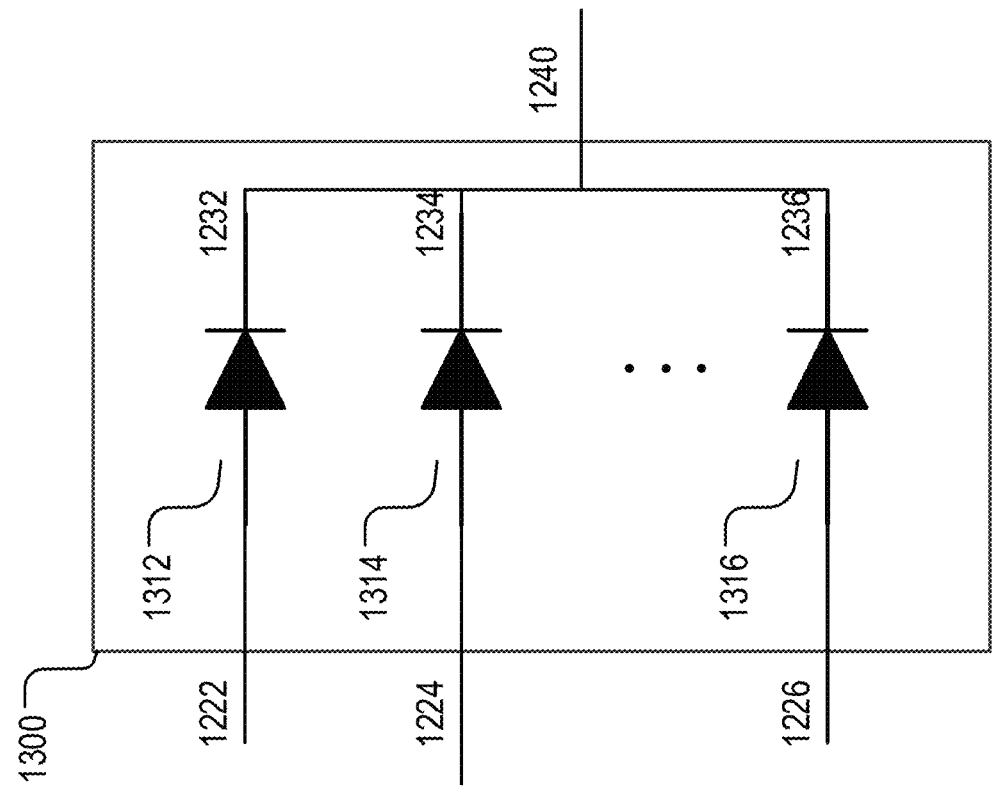
FIG. 13 is a schematic diagram of one implementation of the starting-signal isolator described in FIG. 12.

FIG. 13 describes one embodiment of a starting-signal isolator 1300 including one or more isolating devices (1312, 1314, and 1316). Each of one or more isolating devices (1312, 1314, and 1316) may include a diode. The diode, including an input and an output, may conduct electric signal primarily from the input to output due to its asymmetric conductance: low or almost zero resistance in the direction from the input to the output, and high or almost infinite resistance in the direction from the output to the input.

Referring to FIG. 13, when one of the inputs (1222, 1224, and 1226) has a high voltage and the rest of the inputs has a low voltage or zero voltage, the output 1240 may have a high voltage. For one example, the first input 1222 has a high voltage and the second and third inputs (1224 and 1226) have a low voltage. The first diode 1312 may conduct electric signal from its input 1222 to its output 1232 because the first input 1222 has the high voltage. Therefore, the first output 1232 may have the high voltage. The second diode 1314 and the third diode 1316 may block the feedback signal conduction from their corresponding outputs (1234 and 1236, respectively) to their corresponding inputs (1224 and 1226, respectively) because the second and third inputs (1224 and 1226) has the low voltage. Therefore, when one of the inputs (1222, 1224, and 1226) has a high voltage, the output 1240 of the starting-signal isolator 1300 may have the high voltage as well.

FIG. 14 describes another embodiment of a starting-signal isolator including one or more isolating devices (1412, 1414, and 1416). Each of one or more isolating devices (1412, 1414, and 1416) may include a relay. The relay, including an input and an output, may be normally open, and may conduct electric signal when the input has a high voltage. Therefore, the relay may have different conductance based on the input: when the input has a high voltage, low or almost zero resistance between the input and the output, and when the input has a low or zero voltage, high or almost infinite resistance between the input and the output. In one implementation, the relay my include a mini-cube relay, a single pole single throw (SPST) relay, or a single pole double throw (SPDT) relay.

Referring to FIG. 14, when one of the inputs (1222, 1224, and 1226) has a high voltage and the rest of the inputs has a low voltage or zero voltage, the output 1240 may have a high voltage. For one example, the first input 1222 has a high voltage and the second and third inputs (1224 and 1226) have a low voltage. Because the first input 1222 has the high voltage, the first relay 1412 may be closed so that it conducts electric signal from its input 1222 to its output 1232, and thus, the first output 1232 may have the high voltage. Because the second and third inputs (1224 and 1226) have the low voltage, the second relay 1414 and the third relay 1416 may be in an open state so that their corresponding outputs (1234 and 1236) may be blocked/disconnected to their corresponding inputs (1224 and 1226), respectively. Therefore, when one of the inputs (1222, 1224, and 1226) has a high voltage, the output 1240 of the starting-signal isolator 1400 may have a high voltage as well.

The present disclosure may further describe an embodiment of a starting-signal isolator including one or more isolating devices, wherein the one or more isolating devices may include different types of isolating devices, for example but not limited to, diodes or relays.

FIG. 15A describe one embodiment for a plug connector 1510 of a starting-signal isolator. The connector may include one or more pins, and each of the one or more pins may correspond to each isolating device of the starting-signal isolator. The connector 1510 may be mounted on a panel of the supplemental starting system. FIG. 15B describe a receptacle connector 1520 corresponding to the plug connector 1510. The receptacle connector 1520 may receive signals from an engine starting control and may be configured to mate together with the plug connector 1510. In one implementation, the connector may include 8 pins, for example, a Deutsch 8-pin 14-16 AWG Flange connector.

Figure 16:
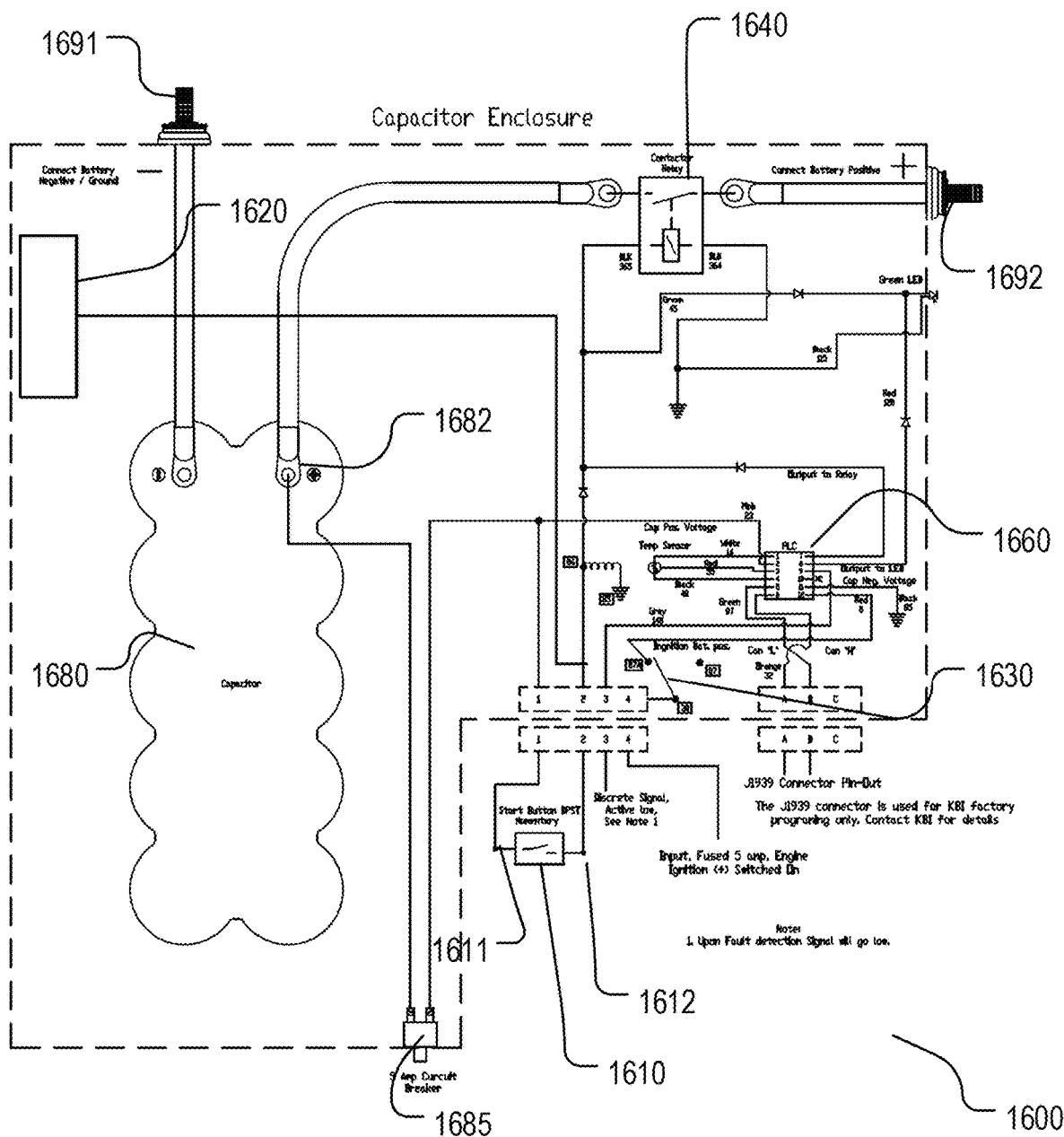
FIG. 16 is a schematic electrical diagram of a supplemental starting system for providing supplemental power to start one or more engines.

The present disclosure describe one embodiment of a supplemental starting system in FIG. 16. The supplemental starting system 1600 may include a start signal isolator 1620, a resetting relay 1630, a PLC 1660, a supplemental battery relay 1640, and a supplemental battery 1680. The start signal isolator 1620 may receive signals from an engine starting control and may include an output terminal which electrically connects to a coil pin of the resetting relay 1630 and a coil pin of the supplemental battery relay 1640. The supplemental battery 1680 may include a super capacitor battery.

Optionally, the supplemental starting system 1600 may include an emergency start switch 1610. Under the conditions that a main battery power is not sufficient or too weak to enable an engine start signal through the engine start control to enable the supplemental starting system 1600, the emergency start switch 1610 may be used to supply a battery power from the supplemental battery 1680 to enable the supplemental starting system 1600. When the emergency start switch 1610 is closed, an input 1611 of the emergency start switch 1610 is electrically connect to an output 1612 of the emergency start switch 1610. The input 1611 may connect to a positive terminal 1682 of the supplemental battery 1680 via a fuse 1685. The output 1612 may connect to the coil pin of the resetting relay 1630 and the coil pin of the supplemental battery relay 1640.

The present disclosure also describe a method for providing a supplemental starting system to start one or more cranking motors. The method 1700 may include one or more of the following steps, as shown in FIG. 17. The supplemental starting system may be either one of the supplemental starting systems described above or a combination of any portion of one or more of the supplemental starting systems described above.

Step 1710: receiving, by a starting-signal isolator of a supplemental starting system, wherein the starting-signal isolator is configured to connect to one or more electrical starting signal wires which provide starting signal to one or more cranking motors.

Step 1720: when one of the one or more electrical starting signal wires has the high voltage signal, outputting, by the starting-signal isolator of the supplemental starting system, a high voltage signal.

Step 1730: setting a resetting relay in an open state, wherein the resetting relay electrically connects to the starting-signal isolator.

Step 1740: resetting a first programmable logic controller (PLC) electrically connects to the resetting relay.

Step 1750: setting a supplemental battery relay in a close state, wherein the supplemental battery relay electrically connects to the starting-signal isolator and the PLC.

Step 1760: electrically connecting a positive terminal of a supplemental battery to a positive output-terminal of the supplemental starting system.

Step 1770: providing electricity to start one of the one or more cranking motors.

The present disclosure describes the method further including one or more of the following steps, as shown in FIG. 18.

Step 1810: electrically connecting, by an emergency starting switch of the supplemental starting system, a positive terminal of the supplemental battery to the supplemental battery relay, so that the supplemental battery relay is configured to be in the close state, and the supplemental starting system is configured to providing electricity to one of the one or more cranking motors.

While the present disclosure has been described with reference to illustrative embodiments, this description is not meant to be limiting. Various modifications of the illustrative embodiments and additional embodiments of the present disclosure will be apparent to one of ordinary skill in the art from this description. Those skilled in the art will readily recognize that these and various other modifications can be made to the exemplary embodiments, illustrated and described herein, without departing from the spirit and scope of the present disclosure. It is therefore contemplated that the appended claims will cover any such modifications and alternate embodiments. Certain proportions within the illustrations may be exaggerated, while other proportions may be minimized. Accordingly, the disclosure and the figures are to be regarded as illustrative rather than restrictive.

The invention claimed is:

1. A supplemental starting system for providing supplemental power to start one or more cranking motors, the supplemental starting system comprising:
   a starting-signal isolator configured to connect to one or more electrical starting-signal wires providing starting signal to one or more cranking motors;

a resetting relay electrically connecting to the starting-signal isolator;
a programmable logic controller (PLC) electrically connecting to the resetting relay;
a supplemental battery relay electrically connecting to the starting-signal isolator and the PLC;
a supplemental battery comprising a positive terminal electrically connecting to the supplemental battery relay;
a positive output-terminal electrically connecting to the supplemental battery relay; and
wherein when an output of the starting-signal isolator is higher than a threshold voltage, the resetting relay is configured to be in a close state and the supplemental battery relay is configured to be in a close state, so that the supplemental starting system is configured to provide electricity to one of the one or more cranking motors.

2. The supplemental starting system according to claim 1, further comprising a negative output-terminal electrically connecting to a negative terminal of the supplemental battery.

3. The supplemental starting system according to claim 1, wherein the starting-signal isolator comprises:
one or more inputs of the starting-signal isolator, wherein each of the one or more electrical starting-signal wires is configured to connect one of the one or more inputs of the starting-signal isolator; and
one or more isolating devices, wherein each input of the one or more isolating devices connects to one of the one or more inputs of the starting-signal isolator, respectively, each output of the one or more isolating devices connects to the output of the starting-signal isolator, and the one or more isolating devices are configured to block electrical feedback from the output of the one or more isolating devices to the input of the one or more isolating devices.

4. The supplemental starting system according to claim 1, wherein the resetting relay comprises:

a coil pin electrically connecting to the output of the starting-signal isolator;
a common pole pin configured to receive an engine ignition signal;
a normally close pin electrically connecting to the PLC; and
a normally open pin.

5. The supplemental starting system according to claim 1, further comprising an emergency starting switch electrically connecting to the resetting relay and the supplemental battery relay, and
wherein when the emergency starting switch is in a close state, the supplemental battery relay is configured to be in the close state, so that the supplemental starting system is configured to supply power to one or more cranking motors.

6. The supplemental starting system according to claim 5, wherein the emergency starting switch comprises:
an input pin electrically connecting to the positive terminal of the supplemental battery; and
an output pin electrically connecting to the resetting relay and the supplemental battery relay.

7. The supplemental starting system according to claim 1, wherein the supplemental battery relay comprises:
a coil pin electrically connecting to the starting-signal isolator and the PLC;
a common pin electrically connecting to the positive terminal of the supplemental battery; and
a normally open pin electrically connecting to the positive output-terminal.

8. The supplemental starting system according to claim 7, wherein:
when the coil pin of the supplemental battery relay has a high voltage, the supplemental battery relay is in a close state; and
when the coil pin of the supplemental battery relay has a low voltage, the supplemental battery relay is in an open state.

* * * * *